US012641245B2

(12) United States Patent
Ge et al.

(10) Patent No.: US 12,641,245 B2
(45) Date of Patent: May 26, 2026

(54) FEATURE DOMAIN OPTICAL FLOW DETERMINING METHOD AND RELATED DEVICE

(71) Applicant: HUAWEI TECHNOLOGIES CO., LTD., Shenzhen (CN)

(72) Inventors: Yunying Ge, Beijing (CN); Jing Wang, Beijing (CN); Yibo Shi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/819,998

(22) Filed: Aug. 29, 2024

(65) Prior Publication Data

US 2024/0422324 A1     Dec. 19, 2024

Related U.S. Application Data

(63) Continuation of application No. PCT/CN2023/078866, filed on Feb. 28, 2023.

(30) Foreign Application Priority Data

Mar. 4, 2022     (CN) ........................ 202210215293.X

(51) Int. Cl.
*H04N 19/137*          (2014.01)
*H04N 19/169*          (2014.01)
*H04N 19/30*           (2014.01)

(52) U.S. Cl.
CPC ......... *H04N 19/137* (2014.11); *H04N 19/169* (2014.11); *H04N 19/30* (2014.11)

(58) Field of Classification Search
CPC ..... H04N 19/137; H04N 19/169; H04N 19/30
(Continued)

(56) References Cited

U.S. PATENT DOCUMENTS 12,118,445 B1 *  10/2024  Tariq ..................... G06V 10/82
2021/0097648 A1   4/2021  Fang et al.
(Continued)

FOREIGN PATENT DOCUMENTS

CN          111160229 A      5/2020
CN          112767441 A      5/2021

OTHER PUBLICATIONS

Lielin Jiang et al: "PP-MSVSR: Multi-Stage Video Super-Resolution." arXiv:2112.02828v1 [cs.CV] Dec. 6, 2021. total 8 pages.

(Continued)

*Primary Examiner* — Allen C Wong
(74) *Attorney, Agent, or Firm* — WOMBLE BOND DICKINSON (US) LLP

(57)               ABSTRACT

This application provides a feature domain optical flow determining method and a related device, and relates to the field of video or picture compression technologies based on artificial intelligence (AI). The method specifically includes: obtaining a picture domain optical flow between a current frame and a reference frame; performing multi-scale feature extraction on the reference frame, to obtain M feature maps of the reference frame, where M is an integer greater than or equal to 1; and performing M times of feature domain optical flow estimation based on the M feature maps of the reference frame and the picture domain optical flow between the current frame and the reference frame, to obtain M feature domain optical flows. A feature domain optical flow obtained by using the solutions of this application is more accurate and more stable, thereby improving inter-prediction accuracy.

17 Claims, 15 Drawing Sheets

(58) Field of Classification Search
USPC ...................................................... 375/240.02
See application file for complete search history.

(56) References Cited

U.S. PATENT DOCUMENTS

2022/0198707 A1 *  6/2022  Li ............................. G06T 7/75
2022/0222833 A1     7/2022  Zhang et al.

OTHER PUBLICATIONS

Kelvin C.K. Chan et al: "BasicVSR++: Improving Video Super-Resolution with Enhanced Propagation and Alignment." Apr. 27, 2021. total 10 pages.
Park Woonsung et al: "Deep Predictive Video Compression Using Mode-Selective Uni-and Bi-Directional Predictions Based on Multi-Frame Hypothesis", IEEE Access, IEEE, USA, vol. 9, Dec. 21, 2020 (Dec. 21, 2020), XP011829522, total 14 pages.

* cited by examiner

300

Video coding device

310

320

330

Processor

Coding module

370

340

350

Receiver unit

Transmitter unit

360 Memory

Downlink port

Uplink port

400

402 Processor

418 Display

412

Data — 406

Applications: 1 ...

Applications: video coding

Applications: ... N

Operating system — 408

410

404

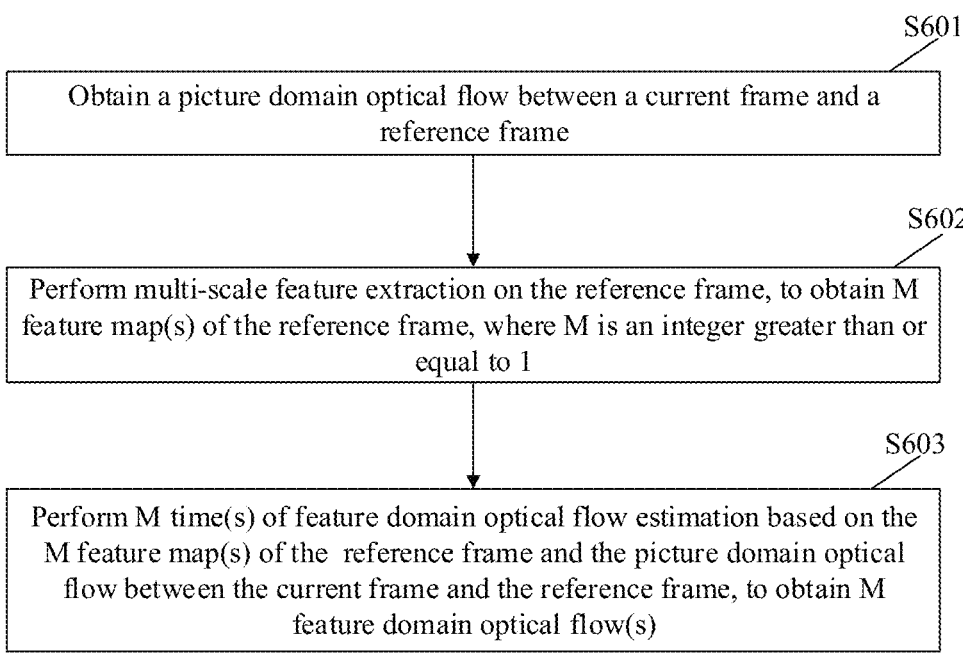

S601

Obtain a picture domain optical flow between a current frame and a reference frame

S602

Perform multi-scale feature extraction on the reference frame, to obtain M feature map(s) of the reference frame, where M is an integer greater than or equal to 1

S603

Perform M time(s) of feature domain optical flow estimation based on the M feature map(s) of the reference frame and the picture domain optical flow between the current frame and the reference frame, to obtain M feature domain optical flow(s)

FIG. 6

Convolutional layer:
Nx3x3/2↓

Relu activation layer

Convolutional layer:
Nx3x3

FIG. 7

FEATURE DOMAIN OPTICAL FLOW DETERMINING METHOD AND RELATED DEVICE

CROSS-REFERENCE TO RELATED APPLICATIONS

This application is a continuation of International Application No. PCT/CN2023/078866, filed on Feb. 28, 2023, which claims priority to Chinese Patent Application No. 202210215293.X, filed on Mar. 4, 2022. The disclosures of the aforementioned applications are hereby incorporated by reference in their entireties.

TECHNICAL FIELD

This application relates to the field of videos and pictures, and in particular, to a feature domain optical flow determining method and a related device.

BACKGROUND

In the video coding field, coding is performed in a picture domain or a feature domain by using a video compression (DVC) architecture, an FVC architecture, or a similar architecture. A video coding procedure based on the DVC architecture includes: An encoder side extracts a picture domain optical flow between a current frame and a reference frame; performs coding on the picture domain optical flow, to obtain a decoded optical flow; performs prediction based on the reference frame and the decoded optical flow, to obtain a predicted value of the current frame; determines a residual based on the predicted value of the current frame and the current frame; and encodes the residual, to obtain a residual bitstream. A decoder side decodes the residual bitstream, to obtain a decoded residual; and obtains a reconstructed picture of the current frame based on the decoded residual and the predicted value of the current frame. However, a specific error exists in obtaining a picture domain optical flow between two frames, while prediction for a current frame based on a picture domain optical flow is very sensitive to precision obtained by using the picture domain optical flow. As a result, a slight change of the picture domain optical flow severely affects a predicted value.

A video coding procedure based on the FVC architecture includes: An encoder side separately extracts a feature of a current frame and a feature of a reference frame; estimates a feature domain optical flow based on the feature of the reference frame and the feature of the current frame; performs coding on the feature domain optical flow, to obtain a decoded feature domain optical flow; performs prediction based on the feature of the reference frame and the decoded feature domain optical flow, to obtain a predicted feature of the current frame; obtains a feature domain residual based on the feature of the current frame and the predicted feature of the current frame; and encodes the feature domain residual, to obtain a feature domain residual bitstream. A decoder side decodes the feature domain residual bitstream, to obtain a decoded feature domain residual; obtains a reconstructed feature of the current frame based on the decoded feature domain residual and the predicted feature of the current frame; and obtains a reconstructed picture of the current frame based on the reconstructed feature of the current frame. However, effective monitoring is not well implemented in determining the feature domain optical flow based on the feature of the current frame and the feature of the reference frame. As a result, it is difficult to obtain a feature domain optical flow with high precision. This affects compression performance.

SUMMARY

This application provides a feature domain optical flow determining method and a related device. A feature domain optical flow with high precision can be obtained by using the solutions in this application, to improve picture compression quality and save a bit rate.

Particular embodiments are outlined in the attached independent claims, with other embodiments in the dependent claims.

According to a first aspect, this application relates to a feature domain optical flow determining method. The method may be performed by a terminal device. The method includes: obtaining a picture domain optical flow between a current frame and a reference frame; performing multi-scale feature extraction on the reference frame, to obtain M feature map(s) of the reference frame, where M is an integer greater than or equal to 1; and performing M time(s) of feature domain optical flow estimation based on the M feature map(s) of the reference frame and the picture domain optical flow between the current frame and the reference frame, to obtain M feature domain optical flow(s). The current frame and the reference frame may be two frames in a video.

In one embodiment, the picture domain optical flow between the current frame and the reference frame may be a picture domain optical flow from the current frame to the reference frame, or may be a picture domain optical flow from the reference frame to the current frame.

The picture domain optical flow indicates a motion speed and a motion direction of each pixel in the two frames of pictures.

The feature domain optical flow obtained based on the picture domain optical flow is more accurate and more stable, thereby improving inter-prediction accuracy.

In one embodiment, when M=1, the M feature map of the reference frame is a target feature map, and the performing M time(s) of feature domain optical flow estimation based on the M feature map(s) of the reference frame and the picture domain optical flow between the current frame and the reference frame, to obtain M feature domain optical flow(s) includes: performing feature domain optical flow estimation based on the target feature map and the picture domain optical flow between the current frame and the reference frame, to obtain a first feature domain optical flow; and performing adaptive processing on the first feature domain optical flow based on a feature map of the current frame and the target feature map, to obtain a second feature domain optical flow, where precision obtained by using the second feature domain optical flow is higher than precision obtained by using the first feature domain optical flow, and the M feature domain optical flow is the second feature domain optical flow.

In one embodiment, when M=1, the M feature map of the reference frame is a target feature map, and the performing M time(s) of feature domain optical flow estimation based on the M feature map(s) of the reference frame and the picture domain optical flow between the current frame and the reference frame, to obtain M feature domain optical flow(s) includes:

performing feature domain optical flow estimation based on the target feature map and the picture domain optical flow between the current frame and the reference frame, to obtain a first feature domain optical flow;

performing at least one time of iteration processing based on a feature map of the current frame, the target feature map, and the first feature domain optical flow, to obtain a third feature domain optical flow, where the M feature domain optical flow is the third feature domain optical flow; and when a $j^{th}$ time of iteration processing is performed, performing feature alignment processing on the target feature map and a feature domain optical flow $$v_t^{fj},$$

to obtain a predicted feature map $$\tilde{f}_t^{\,j}$$

of the current frame, where j is an integer greater than 0, and when j=1, the feature domain optical flow $$v_t^{fj}$$

is the first feature domain optical flow; performing fine-tuning processing based on the target feature map, the feature map of the current frame, and the predicted feature map $$\tilde{f}_t^{\,j}$$

of the current frame, to obtain a fine-tuned feature domain optical flow $$vf_{t1}^j;$$

fusing the fine-tuned feature domain optical flow $$vf_{t1}^j$$

and a feature domain optical flow $$vf_{t2}^{j-1},$$

to obtain a feature domain optical flow $$vf_t^{fj+1}$$

where when j=1, the feature domain optical flow $$vf_{t2}^j,$$

is the first feature domain optical flow; and determining a feature domain optical flow $$vf_{t2}^{j-1}$$

based on the feature domain optical flow $$vf_{t2}^j.$$

If the feature domain optical flow $$vf_t^{fj+1}$$

is obtained through a final time of iteration processing, the feature domain optical flow $$vf_t^{fj+1}$$

is the third feature domain optical flow.

Precision obtained by using the feature domain optical flow $$vf_t^{fj+1}$$

is higher than precision obtained by using the feature domain optical flow $$v_t^{fj}.$$

Precision obtained by using the third feature domain optical flow is higher than precision obtained by using the first feature domain optical flow. Fine-tuning processing is performed on the obtained feature domain optical flow, thereby further improving precision obtained by using the feature domain optical flow.

In one embodiment, when M=1, the M feature map of the reference frame is a target feature map, and the performing M time(s) of feature domain optical flow estimation based on the M feature map(s) of the reference frame and the picture domain optical flow between the current frame and the reference frame, to obtain M feature domain optical flow(s) includes:

performing feature domain optical flow estimation based on the target feature map and the picture domain optical flow between the current frame and the reference frame, to obtain a first feature domain optical flow; and performing adaptive processing on the first feature domain optical flow based on a feature map of the current frame and the target feature map, to obtain a second feature domain optical flow;

performing at least one time of iteration processing based on the feature map of the current frame, the target feature map, and the second feature domain optical flow, to obtain a third feature domain optical flow, where the M feature domain optical flow is the third feature domain optical flow; and when a $j^{th}$ time of iteration processing is performed, performing feature alignment processing on the target feature map and a feature domain optical flow $$v_t^{fj},$$

to obtain a predicted feature map $$\tilde{f}_t^j$$

of the current frame, where j is an integer greater than 0, and when j=1, the feature domain optical flow $$v_t^{fj}$$

is the second feature domain optical flow; performing fine-tuning processing based on the target feature map, the feature map of the current frame, and the predicted feature map $$\tilde{f}_t^j$$

of the current frame, to obtain a fine-tuned feature domain optical flow $$vf_{t1}^j;$$

fusing the fine-tuned feature domain optical flow $$vf_{t1}^j$$

and a feature domain optical flow $$vf_{t2}^{j-1},$$

to obtain a feature domain optical flow $$vf_{t2}^j,$$

where when j=1, the feature domain optical flow $$vf_{t2}^{j-1}$$

6 is the first feature domain optical flow; and determining a feature domain optical flow $$v_t^{fj+1}$$

based on the feature domain optical flow $$vf_{t2}^j.$$

If the feature domain optical flow $$v_t^{fj+1}$$

is obtained through a final time of iteration processing, the feature domain optical flow $$v_t^{fj+1}$$

is the third feature domain optical flow.

Precision obtained by using the feature domain optical flow $$v_t^{fj+1}$$

is higher than precision obtained by using the feature domain optical flow $$v_t^{fj}.$$

Precision obtained by using the third feature domain optical flow is higher than precision obtained by using the second feature domain optical flow. Fine-tuning processing is performed on the obtained feature domain optical flow, thereby further improving precision obtained by using the feature domain optical flow.

In one embodiment, the determining a feature domain optical flow $$v_t^{fj+1}$$

based on the feature domain optical flow $$vf_{t2}^j$$

includes:

determining the feature domain optical flow $$vf_{t2}^j$$

as the feature domain optical flow $$v_t^{fj+1};$$

or performing adaptive processing on the feature domain optical flow $$vf_{t2}^j$$

based on the feature map of the current frame and the target feature map, to obtain the feature domain optical flow $$v_t^{fj+1},$$

where precision obtained by using the feature domain optical flow $$v_t^{fj+1}$$

is higher than precision obtained by using the feature domain optical flow $$vf_{t2}^j.$$

Adaptive processing is further performed on the obtained feature domain optical flow, thereby further improving precision obtained by using the feature domain optical flow.

In one embodiment, the method in this application further includes: performing coding processing on the M feature domain optical flow, to obtain a fourth feature domain optical flow; performing feature alignment processing on the fourth feature domain optical flow and the target feature map, to obtain a first predicted feature map of the current frame; obtaining a feature domain residual map based on the feature map of the current frame and the first predicted feature map; and encoding the feature domain residual map, to obtain a feature domain residual bitstream.

The obtained feature domain optical flow is applied to the video compression field, thereby saving a bit rate and also ensuring quality.

In one embodiment, the method in this application further includes:

performing feature alignment processing on the M feature domain optical flow and the target feature map, to obtain a second predicted feature map of the current frame, where the fourth feature domain optical flow is the first feature domain optical flow, the second feature domain optical flow, or the third feature domain optical flow; performing feature fusion based on the feature map of the current frame and the second predicted feature map, to obtain an enhanced feature map of the current frame; and performing picture reconstruction on the enhanced feature map, to obtain a reconstructed picture of the current frame.

The obtained feature domain optical flow is applied to the video enhancement field, thereby improving video enhancement effect and improving video quality.

In one embodiment, when M is greater than 1, the M feature maps of the reference frame are M feature maps of reference frame at different scales, and the method in this application further includes:

performing M times of feature reconstruction processing based on M predicted feature maps of the current frame, to obtain a reconstructed picture of the current frame, where a processed video includes the reconstructed picture of the current frame, and the M predicted feature maps of the current frame are obtained by performing feature alignment processing separately on the M feature domain optical flows and the M feature maps of the reference frame at different scales.

In one embodiment, the performing M times of feature domain optical flow estimation based on the M feature maps of the reference frame and the picture domain optical flow between the current frame and the reference frame, to obtain M feature domain optical flows includes:

when an $i^{th}$ time of feature domain optical flow estimation is performed, performing optical flow estimation based on a picture domain optical flow feature map $$f v_t^{j-1},$$

to obtain a picture domain optical flow feature map $$f v_t^j,$$

where i is an integer greater than 0 and not greater than M, and when i=1, the picture domain optical flow feature map $$f v_t^{j-1}$$

is the picture domain optical flow between the current frame and the reference frame; and performing adaptive processing based on a feature map $$f_{t-1}^i$$

of the reference frame, the picture domain optical flow feature map $$f v_t^j,$$

and a predicted feature map $$\tilde{f}_t^{i+1}$$

of the current frame, to obtain a feature domain optical flow feature map $$v_t^{fi},$$

where the feature map $$f_{t-1}^i$$

of the reference frame is obtained by performing feature extraction on a feature map $$f_{t-1}^{i-1}$$

of the reference frame, the feature map $$f_{t-1}^{i-1}$$

of the reference frame and the feature map $$f_{t-1}^i$$

of the reference frame are respectively two of the M feature maps of the reference frame, and when i=M, the predicted feature $$\tilde{f}_t^{i+1}$$

of the current frame is a constant, and the M feature domain optical flows include the feature domain optical flow feature map $$v_t^{fi},$$

and the predicted feature $$\tilde{f}_t^{i+1}$$

of the current frame is obtained by performing feature alignment processing on a feature map $$f_{t-1}^{i+1}$$

of the reference frame and a feature domain optical flow feature $$v_t^{fi+1}.$$

Monitoring is performed on feature domain optical flows at a plurality of scales, thereby improving accuracy of the feature domain optical flows obtained at the plurality of scales.

According to a second aspect, this application relates to a terminal device. For beneficial effects, refer to descriptions of the first aspect. Details are not described herein again. The terminal device has a function of implementing operations in the method embodiment in the first aspect. The function may be implemented by hardware, or may be implemented by hardware executing corresponding software. The hardware or the software includes one or more modules corresponding to the foregoing function.

The terminal device includes:

an obtaining unit, configured to obtain a picture domain optical flow between a current frame and a reference frame, where the current frame and the reference frame are two frames in a video;

a feature extraction unit, configured to perform multi-scale feature extraction on the reference frame, to obtain M feature map(s) of the reference frame, where M is an integer greater than or equal to 1; and an optical flow estimation unit, configured to perform M time(s) of feature domain optical flow estimation based on the M feature map(s) of the reference frame and the picture domain optical flow between the current frame and the reference frame, to obtain M feature domain optical flow(s).

In one embodiment, when M=1, the M feature map of the reference frame is a target feature map, and the optical flow estimation unit is specifically configured to:

perform feature domain optical flow estimation based on the target feature map and the picture domain optical flow between the current frame and the reference frame, to obtain a first feature domain optical flow; and perform adaptive processing on the first feature domain optical flow based on a feature map of the current frame and the target feature map, to obtain a second feature domain optical flow, where precision obtained by using the second feature domain optical flow is higher than precision obtained by using the first feature domain optical flow, and the M feature domain optical flow is the second feature domain optical flow.

In one embodiment, when M=1, the M feature map of the reference frame is a target feature map, and the optical flow estimation unit is specifically configured to:

perform feature domain optical flow estimation based on the target feature map and the picture domain optical flow between the current frame and the reference frame, to obtain a first feature domain optical flow;

perform at least one time of iteration processing based on a feature map of the current frame, the target feature map, and the first feature domain optical flow, to obtain a third feature domain optical flow, where the M feature domain optical flow is the third feature domain optical flow; and when a $j^{th}$ time of iteration processing is performed, perform feature alignment processing on the target feature map and a feature domain optical flow $$v_t^{fj},$$

to obtain a predicted feature map $$\tilde{f}_t^j$$

of the current frame, where j is an integer greater than 0, and when j=1, the feature domain optical flow $$v_t^{fj}$$

is the first feature domain optical flow; perform fine-tuning processing based on the target feature map, the feature map of the current frame, and the predicted feature map $$\tilde{f}_t^{j}$$

of the current frame, to obtain a fine-tuned feature domain optical flow $$vf_{r1}^{j};$$

fuse the fine-tuned feature domain optical flow $$vf_{r1}^{j}$$

and a feature domain optical flow $$vf_{r2}^{j-1},$$

to obtain a feature domain optical flow $$vf_{r2}^{j},$$

where when j=1, the feature domain optical flow $$vf_{r2}^{j-1}$$

is the first feature domain optical flow; and determine a feature domain optical flow $$v_t^{fj+1}$$

based on the feature domain optical flow $$vf_{r2}^{j}.$$

If the feature domain optical flow $$v_t^{fj+1}$$

is obtained through a final time of iteration processing, the feature domain optical flow $$v_t^{fj+1}$$

is the third feature domain optical flow.

In one embodiment, when M=1, the M feature map of the reference frame is a target feature map, and the optical flow estimation unit is specifically configured to:

perform feature domain optical flow estimation based on the target feature map and the picture domain optical flow between the current frame and the reference frame, to obtain a first feature domain optical flow; and perform adaptive processing on the first feature domain optical flow based on a feature map of the current frame and the target feature map, to obtain a second feature domain optical flow;

perform at least one time of iteration processing based on the feature map of the current frame, the target feature map, and the second feature domain optical flow, to obtain a third feature domain optical flow, where the M feature domain optical flow is the third feature domain optical flow; and when a $j^{th}$ time of iteration processing is performed, perform feature alignment processing on the target feature map and a feature domain optical flow $$v_t^{fj},$$

to obtain a predicted feature map $$\tilde{f}_t^{j}$$

of the current frame, where j is an integer greater than 0, and when j=1, the feature domain optical flow $$v_t^{fj}$$

is the second feature domain optical flow; perform fine-tuning processing based on the target feature map, the feature map of the current frame, and the predicted feature map $$\tilde{f}_t^{j}$$

of the current frame, to obtain a fine-tuned feature domain optical flow $$vf_{r1}^{j};$$

fuse the fine-tuned feature domain optical flow $$vf_{r1}^{j}$$

and a feature domain optical flow $$vf_{t2}^{j-1},$$

to obtain a feature domain optical flow $$vf_{t2}^{j},$$

where when j=1, the feature domain optical flow $$v_{t}^{fj}$$

is the first feature domain optical flow; and determine a feature domain optical flow $$v_{t}^{fj+1}$$

based on the feature domain optical flow $$vf_{t2}^{j}.$$

If the feature domain optical flow $$v_{t}^{fj+1}$$

is obtained through a final time of iteration processing, the feature domain optical flow $$v_{t}^{fj+1}$$

is the third feature domain optical flow.

In one embodiment, when determining the feature domain optical flow $$v_{t}^{fj+1}$$

based on the feature domain optical flow $$vf_{t2}^{j},$$

the optical flow estimation unit is specifically configured to: determine the feature domain optical flow $$vf_{t2}^{j}$$

as the feature domain optical flow $$v_{t}^{fj+1};$$

or
  perform adaptive processing on the feature domain optical flow $$vf_{t2}^{j}$$

based on the feature map of the current frame and the target feature map, to obtain the feature domain optical flow $$v_{t}^{fj+1},$$

where precision obtained by using the feature domain optical flow $$v_{t}^{fj+1}$$

is higher than precision obtained by using the feature domain optical flow $$vf_{t2}^{j}.$$

In one embodiment, the terminal device further includes:
  a post-processing unit, configured to: perform coding processing on the M feature domain optical flow, to obtain a fourth feature domain optical flow; perform feature alignment processing on the fourth feature domain optical flow and the target feature map, to obtain a first predicted feature map of the current frame; obtain a feature domain residual map based on the feature map of the current frame and the first predicted feature map; and encode the feature domain residual map, to obtain a feature domain residual bitstream.

In one embodiment, the terminal device further includes:
  a post-processing unit, configured to: perform feature alignment processing on the M feature domain optical flow and the target feature map, to obtain a second predicted feature map of the current frame, where the fourth feature domain optical flow is the first feature domain optical flow, the second feature domain optical flow, or the third feature domain optical flow; perform feature fusion based on the feature map of the current frame and the second predicted feature map, to obtain an enhanced feature map of the current frame; and perform picture reconstruction on the enhanced feature map, to obtain a reconstructed picture of the current frame.

In one embodiment, when M is greater than 1, the M feature maps of the reference frame are M feature maps of the reference frame at different scales, and the terminal device further includes:
  a post-processing unit, configured to: perform M times of feature reconstruction processing based on M predicted feature maps of the current frame, to obtain a recon-structed picture of the current frame, where a processed video includes the reconstructed picture of the current frame, and the M predicted feature maps of the current frame are obtained by performing feature alignment processing separately on the M feature domain optical flows and the M feature maps of the reference frame at different scales.

In one embodiment, the optical flow estimation unit is specifically configured to:

when an $i^{th}$ time of feature domain optical flow estimation is performed, perform optical flow estimation based on a picture domain optical flow feature map $$fv_t^{i-1},$$

to obtain a picture domain optical flow feature map $$fv_t^i,$$

where i is an integer greater than 0 and not greater than M, and when i=1, the picture domain optical flow feature map $$fv_t^{i-1}$$

is the picture domain optical flow between the current frame and the reference frame; and perform adaptive processing based on a feature map $$f_{t-1}^i$$

of the reference frame, the picture domain optical flow feature map $$fv_t^i,$$

and a predicted feature map $$\hat{f}_t^{i+1}$$

of the current frame, to obtain a feature domain optical flow feature map $$v_t^{fi},$$

where the feature map $$f_{t-1}^i$$

of the reference frame is obtained by performing feature extraction on a feature map $$f_{t-1}^{i-1}$$

of the reference frame, the feature map $$f_{t-1}^{i-1}$$

of the reference frame and the feature map $$f_{t-1}^i$$

of the reference frame are respectively two of the M feature maps of the reference frame, and when i=M, the predicted feature $$\hat{f}_t^{i+1}$$

of the current frame is a constant, and the M feature domain optical flows include the feature domain optical flow feature map $$v_t^{fi},$$

and the predicted feature $$\hat{f}_t^{i+1}$$

of the current frame is obtained by performing feature alignment processing on a feature map $$f_{t-1}^{i+1}$$

of the reference frame and a feature domain optical flow feature $$v_t^{fi+1}.$$

The method in the first aspect of this application may be performed by the apparatus in the second aspect of this application. Other features and implementations of the method in the first aspect of this application directly depend on functionality and implementations of the apparatus in the second aspect of this application.

According to a third aspect, this application relates to an electronic device, including a processor and a memory. The memory stores instructions that enable the processor to perform the method according to the first aspect.

According to a fourth aspect, a computer-readable storage medium is provided. Instructions are stored in the computer-readable storage medium. When the instructions are executed, one or more processors are enabled to encode video data. The instructions enable the one or more processors to perform the method in any possible embodiment of the first aspect.

According to a fifth aspect, this application relates to a computer program product including program code. When the program code is run, the method in any possible embodiment of the first aspect is performed.

According to a sixth aspect, this application relates to an encoder, configured to perform the method in any possible embodiment of the first aspect.

Details of one or more embodiments are set forth in the accompanying drawings and the description below. Other features, objects, and advantages are apparent from the description, drawings, and claims.

BRIEF DESCRIPTION OF DRAWINGS

To describe the technical solutions in embodiments of this application or in the conventional technology more clearly, the following briefly describes the accompanying drawings used in describing embodiments or the conventional technology. It is clear that the accompanying drawings in the following descriptions show some embodiments of this application, and a person of ordinary skill in the art may still derive other drawings from these accompanying drawings without creative efforts.

FIG. 6 is a schematic flowchart of a feature domain optical flow determining method according to an embodiment of this application;

FIG. 7 is a diagram of an architecture of an optical flow estimation network according to an embodiment of this application;

DESCRIPTION OF EMBODIMENTS

Figure 1:
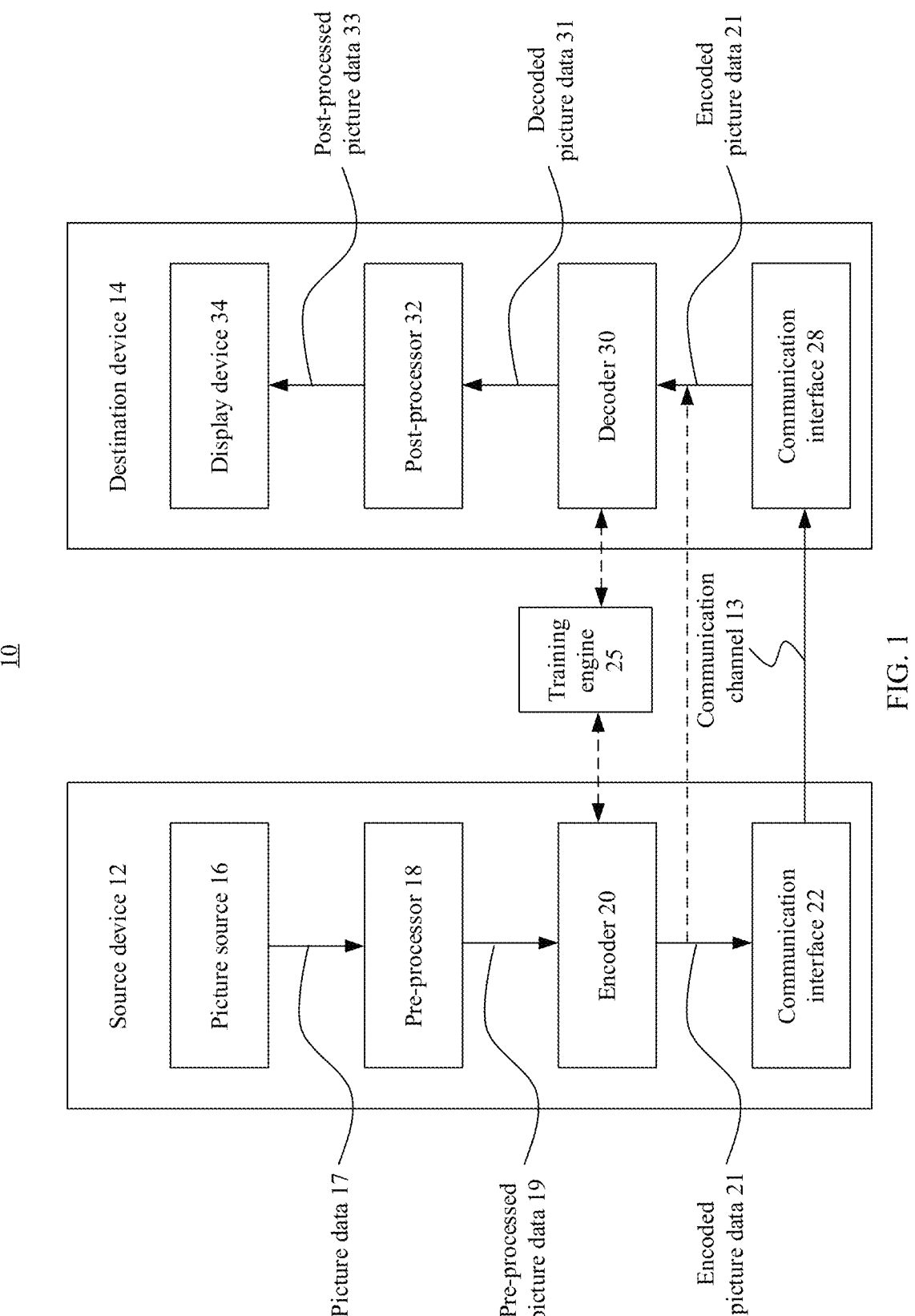
FIG. 1 is a block diagram of an example of a video coding system for implementing an embodiment of this application.

Embodiments of this application provide an AI-based video picture compression technology; in particular, provide a video compression technology based on a neural network; and specifically provide a decoding method based on probability distribution and sampling, to improve a conventional hybrid video coding system.

Video coding generally indicates processing of a picture sequence that forms a video or a video sequence. In the video coding field, the terms "picture", "frame", and "image" may be used as synonyms. Video coding (or coding in general) includes two parts: video encoding and video decoding. Video encoding is performed on a source side, and generally includes processing (for example, compressing) an original video picture to reduce a volume of data needed for representing the video picture (for more efficient storage and/or transmission). Video decoding is performed on a destination side, and generally includes inverse processing in comparison with processing of an encoder to reconstruct a video picture. "Coding" of a video picture (or a picture in general) in embodiments should be understood as "encoding" or "decoding" of a video picture or a video sequence. A combination of an encoding part and a decoding part is also referred to as encoding/decoding (CODEC).

In a case of lossless video coding, an original video picture can be reconstructed. In other words, a reconstructed video picture has same quality as the original video picture (assuming that no transmission loss or no other data loss occurs during storage or transmission). In a case of lossy video coding, further compression is performed through quantization and the like, to reduce a volume of data needed for representing a video picture, and the video picture cannot be completely reconstructed on a decoder side. In other words, quality of a reconstructed video picture is lower or poorer than that of the original video picture.

Embodiments of this application relate to application of a neural network. For ease of understanding, the following first explains some nouns or terms used in embodiments of this application. The nouns or terms are also used as a part of content of the present disclosure.

(1) Neural Network

The neural network may include a neuron. The neuron may be an operation unit that uses $x_s$ and an intercept of 1 as an input. An output of the operation unit may be as follows:

$$h_{W,b}(x) = f(W^T x) = f\left(\sum_{s=1}^{n} W_s x_s + b\right).$$

Herein, s=1, 2, ..., or n, n is a natural number greater than 1, $W_s$ is a weight of $x_s$, b is a bias of the neuron, and f is an activation function (activation function) of the neuron, and is used to introduce a non-linear feature into the neural network to convert an input signal in the neuron into an output signal. The output signal of the activation function may be used as an input of a next convolutional layer. The activation function may be a sigmoid function. The neural network is a network constituted by linking a plurality of single neurons together. To be specific, an output of a neuron may be an input of another neuron. An input of each neuron may be connected to a local receptive field of a previous layer to extract a feature of the local receptive field. The local receptive field may be an area including several neurons.

(2) Deep Neural Network

The deep neural network (DNN), also referred to as a multi-layer neural network, may be understood as a neural network having a plurality of hidden layers. The DNN is divided based on locations of different layers. The neural network in the DNN may be divided into three layers: an input layer, a hidden layer, and an output layer. Generally, the first layer is the input layer, the final layer is the output layer, and the middle layer is the hidden layer. Layers are fully connected. To be specific, any neuron at an $i^{th}$ layer is necessarily connected to any neuron at an $(i+1)^{th}$ layer.

Although the DNN seems complex, it is not complex in terms of work at each layer. Simply speaking, the DNN is the following linear expression: $\vec{y}=a(W\vec{x}+\vec{b})$, where $\vec{x}$ is an input vector, $\vec{y}$ is an output vector, $\vec{b}$ is an offset vector, W is a weight matrix (also referred to as a coefficient), and a( ) is an activation function. At each layer, such a simple operation is performed on the input vector $\vec{x}$, to obtain the output vector $\vec{y}$. Because the DNN includes a large quantity of layers, there are also a large quantity of coefficients W and offset vectors $\vec{b}$. Definitions of these parameters in the DNN are as follows: The coefficient W is used as an example. It is assumed that in a three-layer DNN, a linear coefficient from the fourth neuron at the second layer to the second neuron at the third layer is defined as $$W_{24}^3.$$

The superscript 3 represents a layer at which the coefficient W is located, and the subscript corresponds to an output third-layer index 2 and an input second-layer index 4.

In conclusion, a coefficient from the $k^{th}$ neuron at the $(L-1)^{th}$ layer to the $j^{th}$ neuron at the $L^{th}$ layer is defined as $$W_{jk}^L.$$

It should be noted that there is no parameter W for the input layer. The deep neural network can better describe a complex case in the real world by using more hidden layers in the network. Theoretically, a model with more parameters has higher complexity and a larger "capacity". It indicates that the model can complete a more complex learning task. Training the deep neural network is a process of learning a weight matrix. A final objective of the training is to obtain a weight matrix of all layers of the trained deep neural network (a weight matrix formed by vectors W at many layers).

(3) Convolutional Neural Network

The convolutional neural network (CNN) is a deep neural network with a convolutional structure. The convolutional neural network includes a feature extractor that includes a convolutional layer and a subsampling layer. The feature extractor may be considered as a filter. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neurons that are in a rectangular arrangement. Neurons of a same feature plane share a weight. The shared weight herein is a convolution kernel. Weight sharing may be understood as that a picture information extraction manner is irrelevant to a location. The convolution kernel may be initialized in a form of a matrix with a random size. In a training process of the convolutional neural network, the convolution kernel may obtain an appropriate weight through learning. In addition, benefits directly brought by weight sharing are that connections between layers of the convolutional neural network are reduced, and an overfitting risk is reduced.

(4) Recurrent Neural Network (RNN) is Used to Process Sequence Data.

In a conventional neural network model, layers from an input layer to a hidden layer and to an output layer are fully connected, and nodes at each layer are not connected. A plurality of problems are resolved by using this common neural network. There are still a plurality of problems that cannot be resolved by using this common neural network. For example, to predict a next word in a sentence, a previous word usually needs to be used, because the previous word and the next word in the sentence are not independent. A reason why the RNN is referred to as the recurrent neural network is that a current output of a sequence is also related to a previous output. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training for the RNN is the same as training for a conventional CNN or DNN. The RNN is intended to enable a machine to memorize like a human. Therefore, an output of the RNN needs to depend on current input information and historical memorized information.

(5) Loss Function

In a training process of the deep neural network, because it is expected that an output of the deep neural network is as close as possible to a value that is actually expected to be predicted, a predicted value of the current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed until the deep neural network can predict the target value that is actually expected or a value that is very close to the target value that is actually expected. Therefore, "how to obtain a difference between the predicted value and the target value through comparison" needs to be predefined. This is a loss function or an objective function. The loss function and the objective function are important equations for measuring the difference between the predicted value and the target value. The loss function is used as an example. A higher output value of the loss function (loss) indicates a larger difference. Therefore, training of the deep neural network is a process of minimizing the loss as much as possible.

(6) Back Propagation Algorithm

In a training process, a neural network may correct a value of a parameter of an initial neural network model by using an error back propagation (BP) algorithm, so that a reconstruction error loss of the neural network model becomes increasingly small. Specifically, an input signal is forward transferred until the error loss is generated in an output, and the parameter of the initial neural network model is updated through back propagation of information about the error loss, to converge the error loss. The back propagation algorithm is an error-loss-centered back propagation motion intended to obtain a parameter, such as a weight matrix, of an optimal neural network model.

In the following embodiments of a coding system 10, an encoder 20 and a decoder 30 are described based on FIG. 1 to FIG. 3.

FIG. 1 is a schematic block diagram of an example of the coding system 10, for example, the video coding system 10 (or briefly referred to as the coding system 10) that can utilize technologies in this application. The video encoder 20 (or briefly referred to as the encoder 20) and the video decoder 30 (or briefly referred to as the decoder 30) of the video coding system 10 represent examples of devices that may be configured to perform various technologies in accordance with various examples described in this application.

As shown in FIG. 1, the coding system 10 includes a source device 12. The source device 12 is configured to provide encoded picture data 21 of an encoded picture and the like to, for example, a destination device 14 for decoding the encoded picture data 21.

The source device 12 includes the encoder 20, and may additionally, that is, In one embodiment, include a picture source 16, a pre-processor (or a pre-processing unit) 18 such as a picture pre-processor, and a communication interface (or a communication unit) 22.

The picture source 16 may include or be any type of picture capturing device for capturing a real-world picture and the like, and/or any type of picture generating device, for example, a computer graphics processing unit for generating a computer animated picture or any type of device for obtaining and/or providing a real-world picture, a computer generated picture (for example, a screen content, and/or a virtual reality (VR) picture), and/or any combination thereof (for example, an augmented reality (AR) picture). The picture source may be any type of memory or storage storing any of the foregoing pictures.

For distinguishment of processing performed by the pre-processor (or the pre-processing unit) 18, the picture (or the picture data) 17 may also be referred to as a raw picture (or raw picture data) 17.

The pre-processor 18 is configured to: receive the (raw) picture data 17, and perform pre-processing on the picture data 17, to obtain a pre-processed picture (or pre-processed picture data) 19. For example, pre-processing performed by the pre-processor 18 may include trimming, color format conversion (for example, from RGB to YCbCr), color correction, or de-noising. It may be understood that the pre-processing unit 18 may be an optional component.

The video encoder (or the encoder) 20 is configured to receive the pre-processed picture data 19 and provide the encoded picture data 21 (further details are described below, for example, based on FIG. 2).

The communication interface 22 of the source device 12 may be configured to: receive the encoded picture data 21, and transmit the encoded picture data 21 (or any further processed version thereof) over a communication channel 13 to another device, for example, the destination device 14 or any other device, for storage or direct reconstruction.

The destination device 14 includes the decoder 30, and may additionally, that is, In one embodiment, include a communication interface (or a communication unit) 28, a post-processor (or a post-processing unit) 32, and a display device 34.

The communication interface 28 of the destination device 14 is configured to receive the encoded picture data 21 (or any further processed version thereof) directly from the source device 12 or from any other source device such as a storage device, for example, an encoded picture data storage device, and provide the encoded picture data 21 to the decoder 30.

The communication interface 22 and the communication interface 28 may be configured to transmit or receive the encoded picture data (or encoded data) 21 via a direct communication link between the source device 12 and the destination device 14, for example, a direct wired or wireless connection, or via any type of network, for example, a wired or wireless network or any combination thereof, or any type of private and public network, or any type of combination thereof.

For example, the communication interface 22 may be configured to package the encoded picture data 21 into an appropriate format, for example, packets, and/or process the encoded picture data by using any type of transmission encoding or processing for transmission over a communication link or a communication network.

The communication interface 28 corresponds to the communication interface 22, and may be, for example, configured to receive the transmitted data and process the transmission data through any type of corresponding transmission decoding or processing and/or de-packaging, to obtain the encoded picture data 21.

Both the communication interface 22 and communication interface 28 may be configured as unidirectional communication interfaces indicated by an arrow for the communication channel 13 pointing from the source device 12 to the destination device 14 in FIG. 1, or bidirectional communication interfaces; and may be configured to send and receive messages and the like, to set up a connection, acknowledge and exchange any other information related to the communication link and/or data transmission such as transmission of encoded picture data.

The video decoder (or the decoder) 30 is configured to receive the encoded picture data 21 and provide decoded picture data (or decoded data) 31 (details are further described below based on FIG. 3 and the like).

The post-processor 32 is configured to post-process the decoded picture data 31 (also referred to as reconstructed picture data) such as a decoded picture, to obtain post-processed picture data 33 such as a post-processed picture. The post-processing performed by the post-processing unit 32 may include, for example, color format conversion (for example, from YCbCr to RGB), color correction, trimming, re-sampling, or any other processing, for example, for generating the decoded picture data 31 for display by the display device 34 and the like.

The display device 34 is configured to receive the post-processed picture data 33 for displaying a picture to a user, a viewer, or the like. The display device 34 may be or include any type of display for representing a reconstructed picture, for example, an integrated or external display or display device. For example, the display may include a liquid crystal display (LCD), an organic light emitting diode (OLED) display, a plasma display, a projector, a micro LED display, a liquid crystal on silicon (LCoS), a digital light processor (DLP), or any type of other display.

The coding system 10 further includes a training engine 25. For a specific training process implemented by the training engine 25, refer to subsequent descriptions. Details are not described herein again.

As shown in FIG. 1, the source device 12 and the destination device 14 are separate devices. However, the device embodiment may also include both the source device 12 and the destination device 14, or include functions of both the source device 12 and the destination device 14, that is, include both the source device 12 or a corresponding function and the destination device 14 or a corresponding function. In such embodiments, the source device 12 or corresponding function and the destination device 14 or corresponding function may be implemented by using the same hardware and/or software or by separate hardware and/or software or any combination thereof.

Based on the description, it is clear for a skilled person that existence and (accurate) division of different units or functions of the source device 12 and/or the destination device 14 shown in FIG. 1 may vary depending on an actual device and application.

Figure 2:
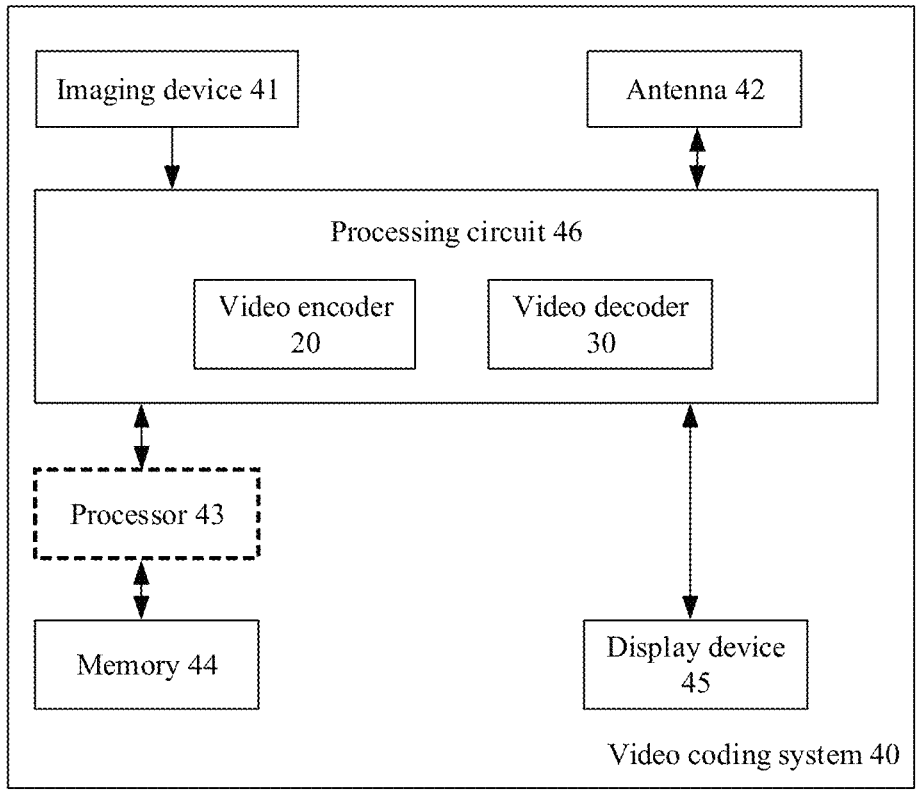
FIG. 2 is a block diagram of another example of a video coding system for implementing an embodiment of this application.

The encoder 20 (for example, the video encoder 20) or the decoder 30 (for example, the video decoder 30) or both may be implemented via a processing circuit shown in FIG. 2, such as one or more microprocessors, a digital signal processor (DSP), an application-specific integrated circuit (ASIC), a field-programmable gate array (FPGA), discrete logic, hardware, a video encoding dedicated processor, or any combination thereof. The encoder 20 may be implemented via a processing circuit 46, to embody the various modules described with reference to the encoder 20 in FIG. 2 and/or any other encoder system or subsystem described in this specification. The decoder 30 may be implemented via the processing circuit 46, to embody the various modules described with reference to the decoder 30 in FIG. 3 and/or any other decoder system or subsystem described in this specification. The processing circuit 46 may be configured to perform various operations described below. As shown in FIG. 4, if some technologies are implemented in software, a device may store software instructions in an appropriate non-transitory computer-readable storage medium, and may execute the instructions in hardware by using one or more processors, to perform the technologies in this application. Either of the video encoder 20 and the video decoder 30 may be integrated as part of a combined codec (CODEC) in a single device, as shown in FIG. 2.

The source device 12 and the destination device 14 may include any one of various devices, including any type of handheld or stationary device, for example, a notebook computer, a laptop computer, a mobile phone, a smartphone, a tablet, a tablet computer, a camera, a desktop computer, a set top box, a television, a display device, a digital media player, a video gaming console, a video streaming device (for example, a content service server or a content delivery server), a broadcast receiving device, a broadcast transmitting device, or the like, and may use or not use any type of operating system. In some cases, the source device 12 and the destination device 14 may be equipped with a wireless communication component. Therefore, the source device 12 and the destination device 14 may be wireless communication devices.

In some cases, the video coding system 10 shown in FIG. 1 is merely an example and the technologies provided in this application are applicable to video coding settings (for example, video encoding or video decoding). These settings do not necessarily include any data communication between an encoding device and a decoding device. In other examples, data is retrieved from a local memory, sent over a network, or the like. The video encoding device may encode data and store encoded data into the memory, and/or the video decoding device may retrieve data from the memory and decode the data. In some examples, encoding and decoding are performed by devices that do not communicate with each other, but simply encode data into the memory and/or retrieve data from the memory and decode the data.

Figure 3:
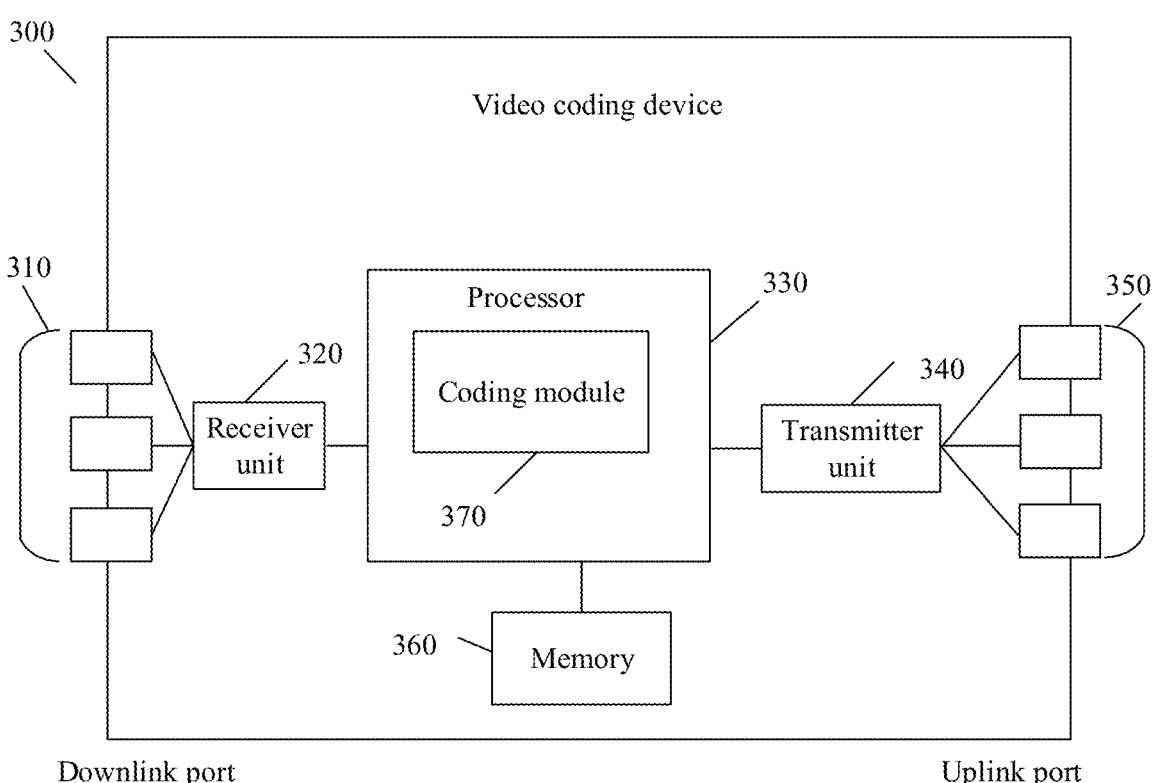
FIG. 3 is a block diagram of a video coding apparatus for implementing an embodiment of this application.
Figure 4:
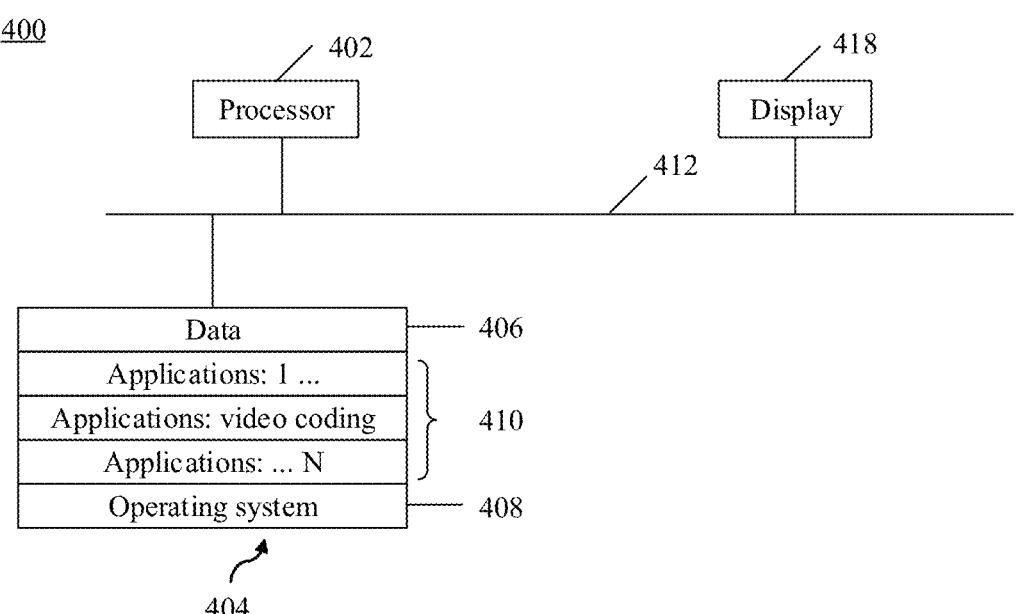
FIG. 4 is a block diagram of a video coding apparatus for implementing an embodiment of this application.

FIG. 2 is an illustrative diagram of an example of a video coding system 40 including the video encoder 20 in FIG. 2 and/or the video decoder 30 in FIG. 3 according to an example embodiment. The video coding system 40 may include an imaging device 41, the video encoder 20, the video decoder 30 (and/or a video encoder/decoder implemented by the processing circuit 46), an antenna 42, one or more processors 43, one or more memories 44, and/or a display device 45.

As shown in FIG. 2, the imaging device 41, the antenna 42, the processing circuit 46, the video encoder 20, the video decoder 30, the processor 43, the memory 44, and/or the display device 45 can communicate with each other. The video coding system 40 may include only the video encoder 20 or only the video decoder 30 in different examples.

In some examples, the antenna 42 may be configured to transmit or receive an encoded bitstream of video data. In addition, in some examples, the display device 45 may be configured to present the video data. The processing circuit 46 may include application-specific integrated circuit (ASIC) logic, a graphics processing unit, a general-purpose processor, or the like. The video coding system 40 may also include the optional processor 43. The optional processor 43 may similarly include application-specific integrated circuit (ASIC) logic, a graphics processing unit, a general-purpose processor, or the like. In addition, the memory 44 may be any type of memory, for example, a volatile memory (for example, a static random access memory (SRAM) or a dynamic random access memory (DRAM)) or a non-volatile memory (for example, a flash memory). In a non-limitative example, the memory 44 may be implemented by a cache memory. In other examples, the processing circuit 46 may include a memory (for example, a cache) for implementing a picture buffer.

In some examples, the video encoder 20 implemented by using the logic circuit may include a picture buffer (implemented by, for example, the processing circuit 46 or the memory 44) and a graphics processing unit (implemented by, for example, the processing circuit 46). The graphics processing unit may be communicatively coupled to the picture buffer. The graphics processing unit may be included in the video encoder 20 implemented by using the processing circuit 46, to embody the modules described with reference to FIG. 2 and/or any other encoder system or subsystem described in this specification. The logic circuit may be configured to perform various operations described in this specification.

In some examples, the video decoder 30 may be implemented by the processing circuit 46 in a similar manner, to implement various modules described with reference to the video decoder 30 in FIG. 3 and/or any other decoder system or subsystem described in this specification. In some examples, the video decoder 30 implemented by using the logic circuit may include a picture buffer (implemented by the processing circuit 46 or the memory 44) and a graphics processing unit (implemented by, for example, the processing circuit 46). The graphics processing unit may be communicatively coupled to the picture buffer. The graphics processing unit may be included in the video decoder 30 implemented by using the processing circuit 46, to embody the modules described with reference to FIG. 3 and/or any other decoder system or subsystem described in this specification.

In some examples, the antenna 42 may be configured to receive an encoded bitstream of video data. As described above, the encoded bitstream may include data, an indicator, an index value, mode selection data, or the like related to video frame encoding described in this specification, for example, data related to encoding partitioning (for example, a transform coefficient or a quantized transform coefficient, an optional indicator (as described), and/or data defining encoding partitioning). The video coding system 40 may further include the video decoder 30 that is coupled to the antenna 42 and that is configured to decode the encoded bitstream. The display device 45 is configured to present a video frame.

It should be understood that in this embodiment of this application, for the example described with reference to the video encoder 20, the video decoder 30 may be configured to perform a reverse process. With regard to a signaling syntax element, the video decoder 30 may be configured to receive and parse such a syntax element and correspondingly decode related video data. In some examples, the video encoder 20 may perform entropy encoding on the syntax element to obtain an encoded video bitstream. In such examples, video decoder 30 may parse such syntax element and correspondingly decode related video data.

For ease of description, embodiments of this application are described with reference to versatile video coding (VVC) reference software or high-efficiency video coding (HEVC) developed by the joint collaboration team on video coding (JCT-VC) constituted by the ITU-T video coding experts group (VCEG) and the ISO/IEC motion picture experts group (MPEG). A person of ordinary skill in the art understands that embodiments of this application are not limited to HEVC or VVC.

FIG. 3 is a diagram of a video coding device 300 according to an embodiment of this application. The video coding device 300 is suitable for implementing the disclosed embodiments described in this specification. In an embodiment, the video coding device 300 may be a decoder such as the video decoder 30 of FIG. 1, or an encoder such as the video encoder 20 of FIG. 1.

The video coding device 300 includes: an ingress port 310 (or an input port 310) and a receiver unit (Rx) 320 configured to receive data; a processor, a logical unit, or a central processing unit (CPU) 330 configured to process data; a transmitter unit (Tx) 340 and an egress port 350 (or an output port 350) configured to transmit data; and a memory 360 configured to store data. For example, the processor 330 may be a neural network processing unit 330. The video coding device 300 may further include an optical-to-electrical (OE) component and an electrical-to-optical (EO) component that are coupled to the ingress port 310, the receiver unit 320, the transmitter unit 340, and the egress port 350, and that are used as egresses or ingresses of optical signals or electrical signals.

The processor 330 is implemented by hardware and software. The processor 330 may be implemented as one or more processor chips, a core (for example, a multi-core processor), an FPGA, an ASIC, and a DSP. The processor 330 communicates with the ingress port 310, the receiver unit 320, the transmitter unit 340, the egress port 350, and the memory 360. The processor 330 includes a coding module 370 (for example, a neural network NN-based coding module 370). The coding module 370 implements the disclosed embodiments described above. For example, the coding module 370 performs, processes, prepares, or provides various coding operations. Therefore, the coding module 370 provides a substantial improvement to functions of the video coding device 300 and affects switching of the video coding device 300 between different states. Alternatively, the coding module 370 is implemented by using instructions that are stored in the memory 360 and executed by the processor 330.

The memory 360 includes one or more magnetic disks, a tape drive, and a solid-state drive; may be used as an over-flow data storage device; and is configured to store a program when such a program is selected for execution and store instructions and data that are read during execution of the program. The memory 360 may be volatile and/or non-volatile, and may be a read-only memory (ROM), a random access memory (RAM), a ternary content addressable memory (TCAM), and/or a static random access memory (SRAM).

FIG. 4 is a simplified block diagram of an example of an apparatus 400 according to an embodiment. The apparatus 400 may be used as either or both of the source device 12 and the destination device 14 from FIG. 1.

A processor 402 in the apparatus 400 may be a central processing unit. Alternatively, the processor 402 may be any other type of device or a plurality of devices that can manipulate or process information that exist nowadays or will be developed in the future. Although the disclosed implementations can be implemented by using a single processor, for example, the processor 402 shown in the figure, a higher speed and higher efficiency are achieved by using more than one processor.

In an implementation, a memory 404 in the apparatus 400 may be a read-only memory (ROM) device or a random access memory (RAM) device. Any other appropriate type of storage device may be used as the memory 404. The memory 404 may include code and data 406 that are accessed by the processor 402 through a bus 412. The memory 404 may further include an operating system 408 and an application 410. The application 410 includes at least one program that allows the processor 402 to perform the methods described in this specification. For example, the application 410 may include applications 1 to N, and further include a video coding application for performing the methods described in this specification.

The apparatus 400 may further include one or more output devices such as a display 418. In an example, the display 418 may be a touch sensitive display that combines a display with a touch sensitive element that may be configured to sense a touch input. The display 418 may be coupled to the processor 402 via the bus 412.

Although the bus 412 in the apparatus 400 is depicted as a single bus in this specification, the bus 412 may include a plurality of buses. In addition, a secondary storage may be directly coupled to the other components of the apparatus 400 or may be accessed via a network, and may include a single integrated unit such as a memory card or a plurality of units such as a plurality of memory cards. The apparatus 400 may be implemented in various configurations.

An application scenario of this application is first described. Application scenarios of the solutions of this application include but are not limited to Huawei Cloud, video surveillance, a video album, live streaming, terminal video recording, storage, transmission, and the like. The method in this application may be applied to all fields that require video inter-frame feature fusion/alignment, for example, video compression, video prediction, video frame interpolation, video enhancement, and video analysis.

Figures 5A, 5B, 5C, 5D:
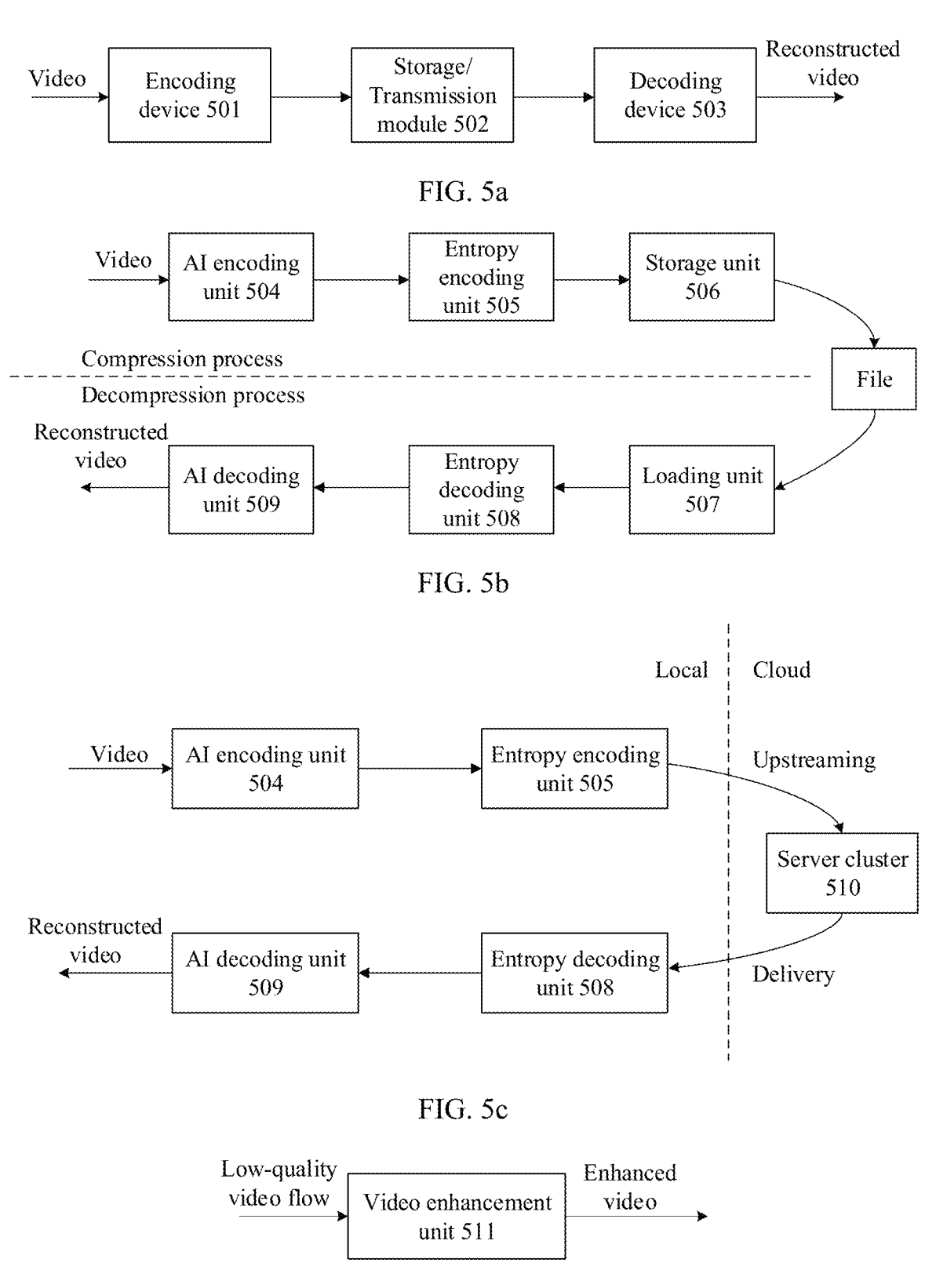
FIG. 5a is a diagram of a video coding architecture according to an embodiment of this application.
FIG. 5b is a diagram of a video storage application architecture according to an embodiment of this application.
FIG. 5c is a diagram of a live streaming architecture according to an embodiment of this application.
FIG. 5d is a diagram of a video enhancement architecture according to an embodiment of this application.

FIG. 5a is a diagram of a video coding architecture according to an embodiment of the present disclosure. As shown in FIG. 5a, the architecture includes an encoding device 501, a storage/transmission module 502, and a decoding device 503.

The encoding device 501 encodes an obtained video, to obtain a bitstream. The storage/transmission module 502 stores the bitstream or transmits the bitstream to the decoding device 503. The decoding device 503 decodes the bitstream, to obtain a reconstructed video. FIG. 5b is used as an example. The encoding device 501 includes an AI encoding unit 504 and an entropy encoding unit 505. The decoding device 503 includes an AI decoding unit 509 and an entropy decoding unit 508. For specific descriptions of functions of the AI encoding unit 504, the entropy encoding unit 505, the AI decoding unit 509, and the entropy decoding unit 508, refer to the following related descriptions.

For example, if a specific scenario is terminal screen recording or video surveillance, the storage/transmission module 502 stores the bitstream; or if a specific scenario is Huawei Cloud or live streaming, the storage/transmission module 502 transmits the bitstream to a corresponding device.

FIG. 5b is a diagram of a video storage application architecture according to an embodiment of this application. As shown in FIG. 5b, the architecture includes an AI encoding unit 504, an entropy encoding unit 505, a storage unit 506, a loading unit 507, an entropy decoding unit 508, and an AI decoding unit 509.

Based on the method in this application, the AI encoding unit 504 obtains a feature domain optical flow between a current frame and a reference frame; encodes the feature domain optical flow, to obtain an encoded feature of the feature domain optical flow; decodes the encoded feature of the feature domain optical flow, to obtain a decoded feature domain optical flow; obtains a predicted feature of the current frame based on a feature map of the reference frame and the decoded feature domain optical flow; obtains a feature domain residual of the current frame based on a feature of the current frame and the predicted feature of the current frame; and encodes the feature domain residual of the current frame, to obtain a feature domain residual feature. The current frame and the reference frame may be two frames in a video.

The entropy encoding unit 505 performs lossless encoding on the feature domain optical flow, to obtain a feature domain optical flow bitstream; and performs lossless compression on the feature domain residual feature, to obtain a feature domain residual bitstream. The obtained feature domain optical flow bitstream and feature domain residual bitstream may be considered as compressed files, that is, files shown in FIG. 5b.

The storage unit 506 stores the compressed files.

The loading unit 507 loads the bitstreams from a device for storing the files.

The entropy decoding unit 508 decodes the feature domain optical flow bitstream, to obtain the encoded feature of the feature domain optical flow; and decodes the feature domain residual bitstream, to obtain the feature domain residual feature.

The AI decoding unit 509 decodes the encoded feature of the feature domain optical flow, to obtain a decoded feature domain optical flow; decodes the feature domain residual feature, to obtain a decoded feature domain residual; obtains a predicted feature of the current frame based on the feature map of the reference frame and the decoded feature domain optical flow; obtains a decoded feature of the current frame based on the predicted feature of the current frame and the decoded feature domain residual; and performs reconstruction on the decoded feature of the current frame, to obtain a decoded picture of the current frame, that is, a reconstructed picture of the current frame.

FIG. 5c is a diagram of a live streaming architecture according to an embodiment of this application. As shown in FIG. 5c, the architecture includes an AI encoding unit 504, an entropy encoding unit 505, a server cluster 510, an entropy decoding unit 508, and an AI decoding unit 509.

Based on the method in this application, the AI encoding unit 504 obtains a feature domain optical flow between a current frame and a reference frame; encodes the feature domain optical flow, to obtain an encoded feature of the feature domain optical flow; decodes the encoded feature of the feature domain optical flow, to obtain a decoded feature domain optical flow; obtains a predicted feature of the current frame based on a feature map of the reference frame and the decoded feature domain optical flow; obtains a feature domain residual of the current frame based on a feature of the current frame and the predicted feature of the current frame; and encodes the feature residual of the current frame, to obtain a feature domain residual feature. The current frame and the reference frame may be two frames in a video.

The entropy encoding unit 505 performs lossless encoding on the feature domain optical flow, to obtain a feature domain optical flow bitstream; and performs lossless compression on the feature domain residual feature, to obtain a feature domain residual bitstream.

The server cluster 510 collects the feature domain optical flow bitstream and the feature domain residual bitstream, and delivers the collected bitstreams to the user equipment.

The entropy decoding unit 508 of user equipment decodes the feature domain optical flow bitstream, to obtain the encoded feature of the feature domain optical flow; and decodes the feature domain residual bitstream, to obtain the feature domain residual feature. The AI decoding unit 509 of the user equipment decodes the encoded feature of the feature domain optical flow, to obtain a decoded feature domain optical flow; decodes the feature domain residual feature, to obtain a decoded feature domain residual; obtains the predicted feature of the current frame based on the feature map of the reference frame and the decoded feature domain optical flow; obtains a decoded feature of the current frame based on the predicted feature of the current frame and the decoded feature domain residual; and performs reconstruction on the decoded feature of the current frame, to obtain a decoded picture of the current frame, that is, a reconstructed picture of the current frame.

Functions of the AI encoding unit 504 and the AI decoding unit 509 are implemented by an NPU. Functions of a storage unit 506, a loading unit 507, the entropy encoding unit 505, and the entropy decoding unit 508 are implemented by a CPU.

FIG. 5d is a diagram of a video enhancement architecture according to an embodiment of this application. As shown in FIG. 5*d*, the video enhancement architecture mainly includes a video enhancement unit 511.

Based on the method in this application, the video enhancement unit 511 obtains a feature domain optical flow between a current frame and a reference frame; obtains a predicted feature of the current frame based on a feature map of the reference frame and the feature domain optical flow; and performs feature fusion and feature reconstruction based on a feature map of the current frame and a feature of the current frame, to obtain an enhanced picture of the current frame.

Functions of the video enhancement unit 511 are implemented by an NPU.

The following specifically describes a specific process of a feature domain optical flow determining method.

FIG. 6 is a schematic flowchart of a feature domain optical flow determining method according to an embodiment of this application. As shown in FIG. 6, the method includes the following operations.

S601: Obtain a picture domain optical flow between a current frame and a reference frame.

The current frame and the reference frame may be two frames in a video.

In one embodiment, a manner of obtaining the picture domain optical flow between the current frame and the reference frame may be an optical flow algorithm based on deep learning, for example, recurrent all-pairs field transforms (RAFT); or an optical flow algorithm based on a conventional method may be used.

The optical flow indicates a motion speed and a motion direction of each pixel in two adjacent frames of pictures. The optical flow has two directions in a time dimension, respectively, an optical flow from a previous frame to a current frame and an optical flow from the current frame to the previous frame. An optical flow in one direction is usually digitally represented by using a three-dimensional array (2, h, w). A first channel indicates an offset direction and a size of a picture in an x direction. A second channel indicates an offset direction and a size of the picture in a y direction. Herein, h and w respectively indicate a height and a width of the picture. In the x direction, a positive value indicates that an object moves leftward, and a negative value indicates that the object moves rightward. In the y direction, a positive value indicates that the object moves upward, and a negative value indicates that the object moves downward.

In one embodiment, the picture domain optical flow between the current frame and the reference frame may be an optical flow from the current frame to the reference frame, or may be an optical flow from the reference frame to the current frame.

S602: Perform multi-scale feature extraction on the reference frame, to obtain M feature map(s) of the reference frame, where M is an integer greater than or equal to 1.

Specifically, when M is greater than 1, the M feature maps of the reference frame are M feature maps of the reference frame at different scales. Feature extraction is performed on a reference frame $x_{-1}$, to obtain a feature map $$f_{t-1}^{1}$$

of the reference frame; feature extraction is performed on the feature map $$f_{t-1}^{1}$$

of the reference frame, to obtain a feature map $$f_{t-1}^{2}$$

of the reference frame; . . . ; and feature extraction is performed on a feature map $$f_{t-1}^{M-1}$$

of the reference frame, to obtain a feature map $$f_{t-1}^{M}$$

of the reference frame. Multi-scale feature extraction is performed in this manner, to obtain the M feature maps of the reference frame at different scales. When M=1, feature extraction is performed on a reference frame picture once. In other words, the M feature map of the reference frame is the feature map $$f_{t-1}^{t}$$

of the reference frame. The feature map $$f_{t-1}^{t}$$

of the reference frame may be referred to as a target feature map.

It should be noted herein that subscripts t of some symbols in this application indicate that data corresponding to these symbols is related to the current frame. For example, $f_t$ indicates a feature map of the current frame, and $$\hat{f}_t^{1}$$

indicates a predicted feature of the current frame. Subscripts t−1 of some symbols indicate that data corresponding to these symbols is related to the reference frame. For example, $f_{t-1}$ indicates a feature map of the reference frame. Subscripts of some symbols in this application are t1 and t2. Symbols whose subscripts are t1 and t2 represent different data.

S603: Perform M time(s) of feature domain optical flow estimation based on the M feature map(s) of the reference frame and the picture domain optical flow between the current frame and the reference frame, to obtain M feature domain optical flow(s).

In a feasible embodiment, when M=1, the M feature map of the reference frame is a target feature map, and the performing M time(s) of feature domain optical flow estimation based on the M feature map(s) of the reference frame and the picture domain optical flow between the current frame and the reference frame, to obtain M feature domain optical flow(s) includes:

performing feature domain optical flow estimation based on the target feature map and the picture domain optical flow between the current frame and the reference frame, to obtain a first feature domain optical flow; and performing adaptive processing on the first feature domain optical flow based on a feature map of the current frame and the target feature map, to obtain a second feature domain optical flow, where precision obtained by using the second feature domain optical flow is higher than precision obtained by using the first feature domain optical flow, and the M feature domain optical flow is the second feature domain optical flow.

Specifically, an optical flow estimation network may perform feature domain optical flow estimation based on the picture domain optical flow $$v_t^x$$

between the current frame and the reference frame and the target feature map $$f_{t-1}^t,$$

to obtain the first feature domain optical flow. The optical flow estimation network is implemented based on a neural network. In an example, FIG. 7 shows an optical flow estimation network. As shown in FIG. 7, the optical flow estimation network includes two convolutional layers and one ReLu activation layer that are interleaved and cascaded. A size of a convolution kernel of each convolutional layer is 3×3. There are N feature map outputting channels. A first convolutional layer performs downsampling by a factor of 2 on a height and a width of the input picture domain optical flow $$v_t^x$$

between the current frame and the reference frame. It is assumed that the size of the picture domain optical flow $$v_t^x$$

between the current frame and the reference frame is [N, H, W]. In this case, a size of a feature domain optical flow feature map $$vf_{t0}^x$$

output by the optical flow estimation network is [N, H/2, W/2], that is, the first feature domain optical flow. For the optical flow estimation network, an input is the picture domain optical flow between the current frame and the reference frame, and an output is the first feature domain optical flow. The size of the first feature domain optical flow is consistent with a size of the current frame.

It should be noted herein that an architecture of the optical flow estimation network is not limited herein. For example, a size of a convolution kernel, a quantity of feature map channels, a downsampling location, a quantity of convolutional layers, and a network activation layer may all be adjusted; or a more complex network structure is used. This is not limited to the architecture shown in FIG. 7.

A first adaptive network performs adaptive processing on the first feature domain optical flow based on the feature map of the current frame and the target feature map, to obtain the second feature domain optical flow. The first adaptive network is implemented based on a neural network. In an example, the first adaptive network is implemented based on a convolutional layer whose convolution kernel has a size of 3×3, and a quantity of channels of feature maps output by the convolutional layer is N. For the first adaptive network, an input is the feature map of the current frame, the feature map of the reference frame, and the first feature domain optical flow, and an output is the feature domain optical flow between the feature map of the current frame and the feature map of the reference frame.

It should be noted herein that an architecture of the first adaptive network is not limited herein. For example, a size of a convolution kernel, a quantity of feature map channels, and a quantity of convolutional layers may all be adjusted, or a more complex network structure is used.

Precision obtained by using the second feature domain optical flow obtained by performing adaptive processing on the first feature domain optical flow is higher than precision obtained by using the first feature domain optical flow.

It should be noted herein that, that the precision obtained by using the second feature domain optical flow is higher than the precision obtained by using the first feature domain optical flow specifically indicates that in a picture or video processing task, overall effect obtained by using the second feature domain optical flow is better than overall effect obtained by using the first feature domain optical flow. For example, in a picture or video enhancement task, quality of an enhanced picture or video obtained by using the second feature domain optical flow is higher than quality of an enhanced picture or video obtained by using the first feature domain optical flow. For another example, in a picture or video compression task, a compression ratio of compression performed by using the second feature domain optical flow is higher than a compression ratio of compression performed by using the first feature domain optical flow.

In a feasible embodiment, when M=1, the M feature map of the reference frame is a target feature map, and performing M time(s) of feature domain optical flow estimation based on the M feature map(s) of the reference frame and the picture domain optical flow between the current frame and the reference frame, to obtain the M feature domain optical flow(s) includes:

performing feature domain optical flow estimation based on the target feature map and the picture domain optical flow between the current frame and the reference frame, to obtain the first feature domain optical flow; and performing adaptive processing on the first feature domain optical flow based on the feature map of the current frame and the target feature map, to obtain the second feature domain optical flow;

performing at least one time of iteration processing based on the feature map of the current frame, the target feature map, and the second feature domain optical flow, to obtain a third feature domain optical flow, where the M feature domain optical flow is the third feature domain optical flow, and precision obtained by using the third feature domain optical flow is higher than the precision obtained by using the second feature domain optical flow; and when a $j^{th}$ time of iteration processing is performed, performing feature alignment processing on the target feature map and a feature domain optical flow $$v_t^{fj},$$

to obtain a predicted feature map $$\tilde{f}_t^{j}$$

of the current frame, where when $j=1$, the feature domain optical flow $$v_t^{fj}$$

is the second feature domain optical flow; performing fine-tuning processing based on the target feature map, the feature map of the current frame, and the predicted feature map $$\tilde{f}_t^{j}$$

of the current frame, to obtain a fine-tuned feature domain optical flow $$vf_{t1}^{j};$$

fusing the fine-tuned feature domain optical flow $$vf_{t1}^{j}$$

and a feature domain optical flow $$vf_{t2}^{j-1},$$

to obtain a feature domain optical flow $$vf_{t2}^{j},$$

where when $j=1$, the feature domain optical flow $$vf_{t2}^{j-1}$$

is the first feature domain optical flow; and determining a feature domain optical flow $$v_t^{fj+1}$$

based on the feature domain optical flow $$vf_{t2}^{j}.$$

If the feature domain optical flow $$v_t^{fj+1}$$

is obtained through a final time of iteration processing, the feature domain optical flow $$v_t^{fj+1}$$

is the third feature domain optical flow, and precision obtained by using the feature domain optical flow $$v_t^{fj+1}$$

is higher than precision obtained by using the feature domain optical flow $$v_t^{fj}.$$

In a specific example, at least one time of iteration processing is performed based on a feature map $f_t$ of the current frame, a target feature map $f_{t-1}$, and a second feature domain optical flow, to obtain a third feature domain optical flow. Precision obtained by using the third feature domain optical flow is higher than precision obtained by using the second feature domain optical flow.

When iteration processing is performed only once, after the second feature domain optical flow is obtained, feature alignment processing is performed on the target feature map $f_{t-1}$ and the second feature domain optical flow, to obtain the predicted feature of the current frame; fine-tuning processing is performed based on the feature map $f_t$ of the current frame, the target feature map $f_{t-1}$, and the predicted feature of the current frame, to obtain the fine-tuned feature domain optical flow; and the fine-tuned feature domain optical flow and the first feature domain optical flow are fused, to obtain a feature domain optical flow $$vf_{t2}^{1}.$$

In an example, the feature domain optical flow $$vf_{t2}^{1}$$

is the third feature domain optical flow. In one embodiment, after the feature domain optical flow $$v f_{t2}^1$$

is obtained, adaptive processing is performed on the feature domain optical $$v f_{t2}^1$$

based on the feature map $f_t$ of the current frame and the target feature map $f_{t-1}$, and an obtained feature domain optical flow is the third feature domain optical flow.

Figure 8:
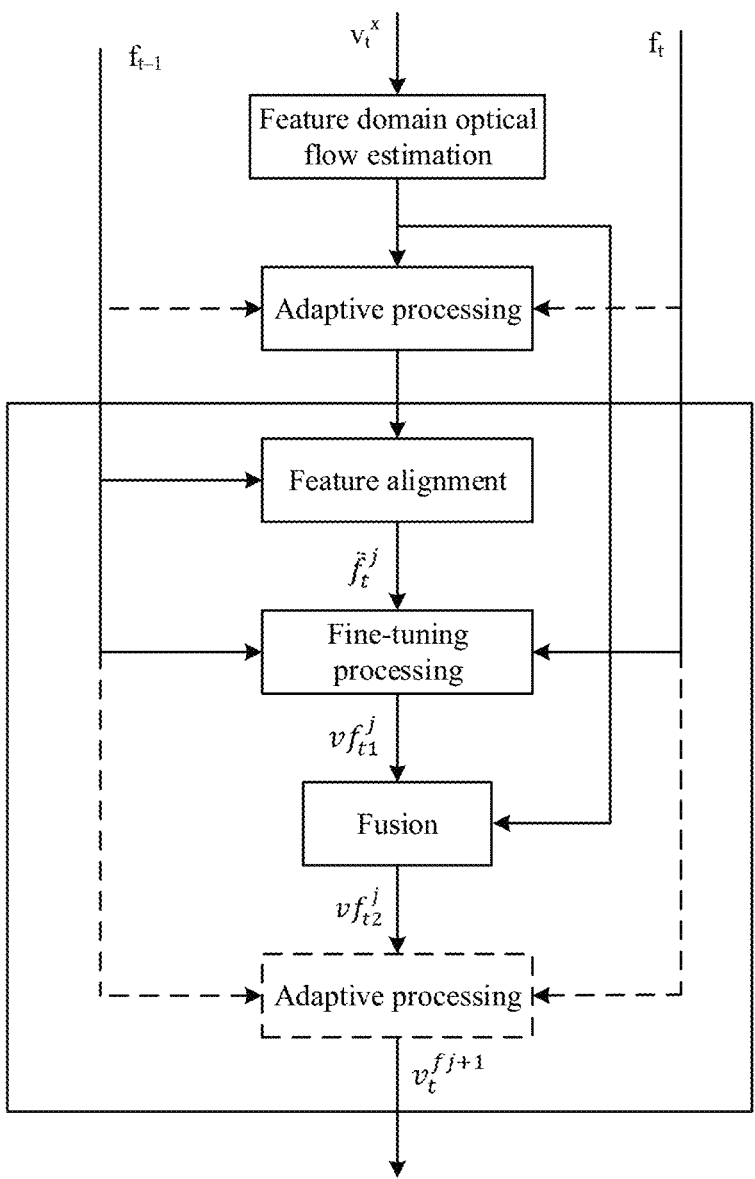
FIG. 8 is a diagram of a feature domain optical flow estimation architecture according to an embodiment of this application.

When a plurality of iterations are performed, as shown in FIG. 8, after the second feature domain optical flow is obtained, feature alignment processing is performed on the target feature map $f_{t-1}$ and the second feature domain optical flow, to obtain a predicted feature $$\tilde{f}_t^1$$

of the current frame; fine-tuning processing is performed based on the feature map $f_t$ of the current frame, the target feature map $f_{t-1}$, and the predicted feature $$\tilde{f}_t^1$$

of the current frame, to obtain a fine-tuned feature domain optical flow $$v f_{t1}^1;$$

and the fine-tuned feature domain optical flow $$v f_{t1}^1$$

and the first feature domain optical flow are fused, to obtain a feature domain optical flow $$v f_{t2}^1.$$

In an example, the feature domain optical flow $$v f_{t2}^1$$

is a feature domain optical flow $$v_t^{f2}.$$

In one embodiment, after the feature domain optical flow $$v f_{t2}^1$$

is obtained, adaptive processing is performed on the feature domain optical flow $$v f_{t2}^1$$

based on the feature map $f_t$ of the current frame and the target feature map $f_{t-1}$, and an obtained feature domain optical flow is a feature domain optical flow $$v_t^{f2}.$$

Feature alignment processing is performed on the target feature map $f_{t-1}$ and the feature domain optical flow $$v_t^{f2},$$

to obtain a predicted feature $$\tilde{f}_t^2$$

of the current frame. Fine-tuning processing is performed based on the feature map $f_t$ of the current frame, the target feature map $f_{t-1}$, and the predicted feature $$\tilde{f}_t^2$$

of the current frame, to obtain a fine-tuned feature domain optical flow $$v f_{t1}^2.$$

The fine-tuned feature domain optical flow $$v f_{t1}^2$$

and the feature domain optical flow $$v f_{t2}^1$$

are fused, to obtain a feature domain optical flow $$v f_{t2}^2.$$

In an example, the feature domain optical flow $$vf_{t2}^{2}$$

is a feature domain optical flow $$v_{t}^{f3}.$$

In one embodiment, after the feature domain optical flow $$vf_{t2}^{2}$$

is obtained, adaptive processing is performed on the feature domain optical flow $$vf_{t2}^{2}$$

based on the feature map $f_{t}$ of the current frame and the target feature map $f_{t-1}$, and an obtained feature domain optical flow is a feature domain optical flow $$v_{t}^{f3}.$$

Two times of iteration processing have been performed herein. When the $j^{th}$ time of iteration processing is performed, feature alignment processing is performed on the target feature map $f_{t-1}$ and the feature domain optical flow $$v_{t}^{fj},$$

to obtain the predicted feature $$\tilde{f}_{t}^{j}$$

of the current frame. Fine-tuning processing is performed based on the feature map $f_{t}$ of the current frame, the target feature map $f_{t-1}$, and the predicted feature $$\tilde{f}_{t}^{j}$$

of the current frame, to obtain the fine-tuned feature domain optical flow $$vf_{t1}^{j}.$$

The fine-tuned feature domain optical flow $$vf_{t1}^{j}$$

and the feature domain optical flow $$vf_{t2}^{j-1}$$

are fused, to obtain a feature domain optical flow $$vf_{t2}^{j}.$$

In an example, the feature domain optical flow $$vf_{t2}^{j}$$

is the feature domain optical flow $$v_{t}^{f(j+1)}.$$

In one embodiment, after the feature domain optical flow $$vf_{t2}^{2}$$

is obtained, adaptive processing is performed on the feature domain optical flow $$vf_{t2}^{j}$$

based on the feature map $f_{t}$ of the current frame and the target feature map $f_{t-1}$, and an obtained feature domain optical flow is the feature domain optical flow $$v_{t}^{f(j+1)}.$$

In this manner, the third feature domain optical flow can be obtained.

It should be noted herein that, that the precision obtained by using the third feature domain optical flow is higher than the precision obtained by using the first feature domain optical flow specifically indicates that in a picture or video processing task, overall effect obtained by using the third feature domain optical flow is better than overall effect obtained by using the first feature domain optical flow. For example, in a picture or video enhancement task, quality of an enhanced picture or video obtained by using the third feature domain optical flow is higher than quality of an enhanced picture or video obtained by using the first feature domain optical flow. For another example, in a picture or video compression task, a compression ratio of compression performed by using the third feature domain optical flow is higher than a compression ratio of compression performed by using the first feature domain optical flow.

It should be understood that for specific meanings of precision obtained by using two feature domain optical flows in other parts of this application, reference may be made to the foregoing related descriptions. Details are not described herein again.

In a feasible embodiment, when M=1, the M feature map of the reference frame is a target feature map, and performing M time(s) of feature domain optical flow estimation based on the M feature map(s) of the reference frame and the picture domain optical flow between the current frame and the reference frame, to obtain the M feature domain optical flow(s) includes: performing feature domain optical flow estimation based on the target feature map and the picture domain optical flow between the current frame and the reference frame, to obtain a first feature domain optical flow;

performing at least one time of iteration processing based on a feature map of the current frame, the target feature map, and the first feature domain optical flow, to obtain a third feature domain optical flow, where precision obtained by using the third feature domain optical flow is higher than precision obtained by using the first feature domain optical flow, and the M feature domain optical flow is the third feature domain optical flow; and when a $j^{th}$ time of iteration processing is performed, performing feature alignment processing on the target feature map and a feature domain optical flow $$v_t^{fj},$$

to obtain a predicted feature map $$\hat{f}_t^j$$

of the current frame, where when j=1, the feature domain optical flow $$v_t^{fj}$$

is the first feature domain optical flow; performing fine-tuning processing based on the target feature map, the feature map of the current frame, and the predicted feature map $$\hat{f}_t^j$$

of the current frame, to obtain a fine-tuned feature domain optical flow $$vf_{t1}^j;$$

fusing the fine-tuned feature domain optical flow $$vf_{t1}^j$$

and a feature domain optical flow $$vf_{t2}^{j-1},$$

to obtain a feature domain optical flow $$vf_{t2}^j,$$

where when j=1, the feature domain optical flow $$vf_{t2}^{j-1}$$

is the first feature domain optical flow; and determining a feature domain optical flow $$v_t^{fj+1}$$

based on the feature domain optical flow $$vf_{t2}^j.$$

If the feature domain optical flow $$v_t^{fj+1}$$

is obtained through a final time of iteration processing, the feature domain optical flow $$v_t^{fj+1}$$

is the third feature domain optical flow, and precision obtained by using the feature domain optical flow $$v_t^{fj+1}$$

is higher than precision obtained by using the feature domain optical flow $$v_t^{fj}.$$

It should be noted herein that, based on the architecture shown in FIG. 8, the second feature domain optical flow may be replaced with the first feature domain optical flow, and other processing remains unchanged.

A condition for stopping the iteration processing is that a quantity of iterations reaches a preset quantity of times, or precision obtained by using a feature domain optical flow obtained through a specific time of iteration processing reaches preset precision.

It should be noted herein that a specific implementation of the feature alignment processing includes but is not limited to warping and a deformable convolutional network (DCN), and certainly, may be another manner in which the feature alignment processing can be implemented.

In an example, a fine-tuning network may perform fine-tuning processing based on the feature map $f_t$ of the current frame, the target feature map $f_{t-1}$, and the predicted feature of the current frame, to obtain the fine-tuned feature domain optical flow. The fine-tuning network is implemented based on a neural network. In an example, the fine-tuning network includes two convolutional layers and one relu activation layer that are interleaved and cascaded. A size of a convolution kernel of each convolutional layer is 3×3. A quantity of channels of feature domain optical flows output by the fine-tuning network is N. It is assumed that sizes of the feature map $f_t$ of the current frame, the target feature map $f_{t-1}$, and the predicted feature of the current frame that are input are [N, H/s, W/s], and a size of the output feature domain optical flow is [N, H/s, W/s].

It should be noted herein that an architecture of the fine-tuning network is not limited. For example, a size of a convolution kernel, a quantity of feature map channels, an upsampling/downsampling factor, a quantity of upsampling/downsampling times, a quantity of convolutional layers, and a network activation layer may all be adjusted, or a more complex network structure is used.

A second adaptive network may specifically perform adaptive processing on the feature domain optical flow based on the feature map $f_t$ of the current frame and the target feature map $f_{t-1}$. The second adaptive network is implemented based on a neural network. In one embodiment, an architecture of the second adaptive network is the same as or different from the architecture of the first adaptive network, for example, different in a size of a convolution kernel, a quantity of convolutional layers, and an ReLu activation layer.

In a feasible embodiment, the method in this application further includes: performing coding processing on the M feature domain optical flow, to obtain a fourth feature domain optical flow; performing feature alignment processing on the fourth feature domain optical flow and the target feature map, to obtain a first predicted feature map of the current frame; obtaining a feature domain residual map based on the feature map of the current frame and the first predicted feature map; and encoding the feature domain residual map, to obtain a feature domain residual bitstream.

In one embodiment, the M feature domain optical flows may be the first feature domain optical flow, the second feature domain optical flow, or the third feature domain optical flow.

Figure 9:
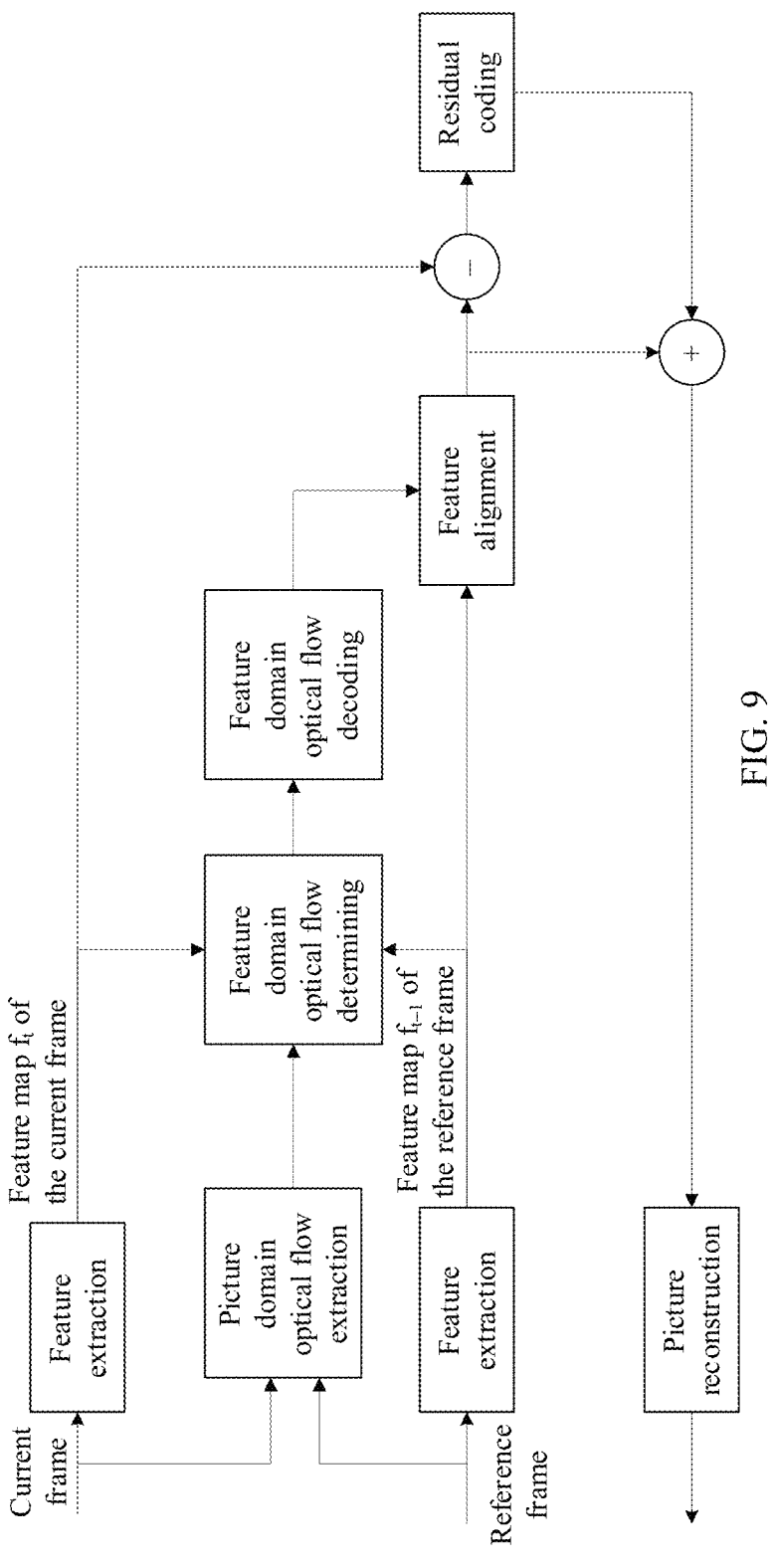
FIG. 9 is a diagram of a video compression process according to an embodiment of this application.

Specifically, as shown in FIG. 9, feature extraction is separately performed on the current frame and the reference frame, to obtain the feature $f_t$ of the current frame and the feature $f_{t-1}$ of the reference frame; the picture domain optical flow between the current frame and the reference frame is obtained; and the first feature domain optical flow, the second feature domain optical flow, or the third feature domain optical flow that may be obtained in the foregoing manner based on the feature map of the current frame, the feature map of the reference frame, and the picture domain optical flow between the current frame and the reference frame. The precision obtained by using the second feature domain optical flow is higher than the precision obtained by using the first feature domain optical flow. The precision obtained by using the third feature domain optical flow is higher than the precision obtained by using the second feature domain optical flow. The M feature domain optical flow(s) are encoded, to obtain the feature domain optical flow bitstream. The M feature domain optical flow(s) may be the first feature domain optical flow, the second feature domain optical flow, or the third feature domain optical flow. The feature domain optical flow bitstream is decoded, to obtain the fourth feature domain optical flow. Feature alignment processing is performed on the feature map $f_{t-1}$ of the reference frame and the fourth feature domain optical flow, to obtain the first predicted feature map of the current frame. The feature alignment processing may be performed in a warping or DCN manner, or certainly may be performed in another manner in which feature alignment can be implemented. This is not limited herein. The feature domain residual map is obtained based on the feature map $f_t$ of the current frame and the first predicted feature map of the current frame. The feature domain residual map is a residual between the feature map $f_t$ of the current frame and the first predicted feature map of the current frame. The feature domain residual map is encoded, to obtain the feature domain residual bitstream. In the foregoing manner, video compression or coding may be completed. For video compression, a file obtained after the video compression includes the feature domain optical flow bitstream and the feature domain residual bitstream that are obtained above.

In one embodiment, the M feature domain optical flow(s) may be the first feature domain optical flow, the second feature domain optical flow, or the third feature domain optical flow.

A process of decoding a bitstream obtained through video compression or coding includes:

performing feature extraction on the reference frame, to obtain the feature map of the reference frame; and decoding the feature domain optical flow bitstream, to obtain a fifth feature domain optical flow; performing feature alignment processing on the feature map $f_{t-1}$ of the reference frame and the fifth feature domain optical flow, to obtain a first predicted feature of the current frame; decoding the feature domain residual bitstream, to obtain a feature domain residual map; obtaining a third predicted feature map of the current frame based on the first predicted feature of the current frame and the feature domain residual map; and performing picture reconstruction based on the third predicted feature map of the current frame, to obtain a reconstructed picture of the current frame.

Figure 10:
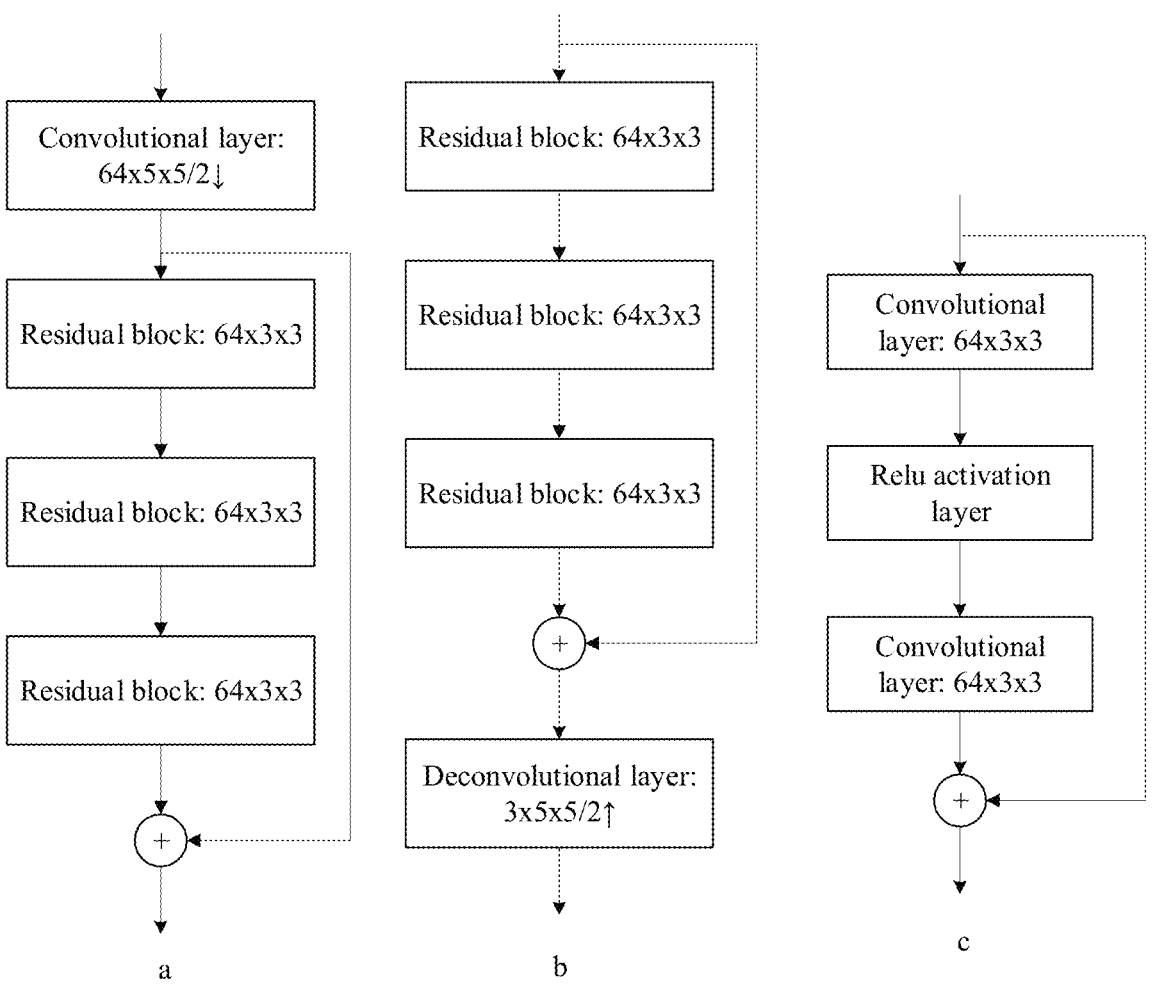
FIG. 10 is a diagram of an architecture of a feature extraction network, feature reconstruction, and a residual block according to an embodiment of this application.

A feature extraction network shown in a in FIG. 10 may perform feature extraction on the current frame and the reference frame. The feature extraction network is implemented based on a neural network. The feature extraction network is implemented by one convolutional layer and three residual blocks. A reconstruction network shown in b in FIG. 10 may perform picture reconstruction based on the third predicted feature map of the current frame. The reconstruction network is implemented based on a neural network. The reconstruction network is implemented by three residual blocks and one deconvolutional layer. A structure of the residual block shown in a and b in FIG. 10 is shown in c in FIG. 10. The residual block is implemented by two convolutional layers and one relu activation layer.

Figure 11:
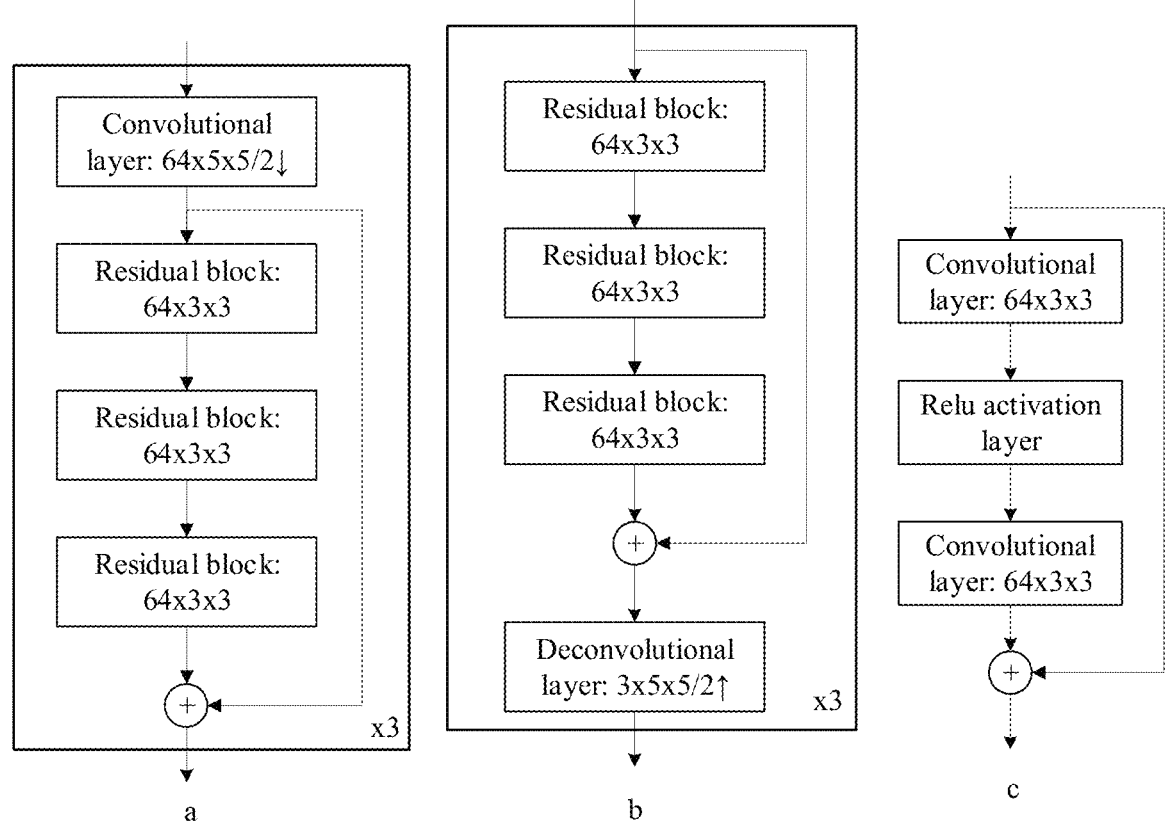
FIG. 11 is a diagram of an architecture of an encoding network, a decoding network, and a residual block according to an embodiment of this application.

An encoding network shown in a in FIG. 11 may encode the M feature domain optical flow(s) and encode the feature domain residual map. The encoding network is implemented based on a neural network. The encoding network includes three convolutional layers and nine residual blocks. A decoding network shown in b in FIG. 11 may decode the feature domain optical flow bitstream and the feature domain residual bitstream. The decoding network is implemented based on a neural network. The decoding network includes three deconvolutional layers and nine residual blocks. A structure of the residual block shown in a and b in FIG. 11 is shown in c in FIG. 11. The residual block is implemented by two convolutional layers and one relu activation layer.

It should be noted herein that the networks shown in FIG. 10 and FIG. 11 are merely examples, and are not intended to limit this application. A size of a convolution kernel, a quantity of feature map channels, an upsampling/downsampling factor, a quantity of upsampling/downsampling times, a quantity of convolutional layers, and a network activation layer in the network shown in FIG. 10 and FIG. 11 may all be adjusted. Certainly, the feature extraction network, the reconstruction network, the encoding network, and the decoding network each may be alternatively a network structure in another form.

An optical flow determined in the manner in this application is used in a video compression or video coding process, thereby saving a bit rate and also ensuring quality.

In another feasible embodiment, the method in this application further includes:

performing feature alignment processing on the M feature domain optical flow(s) and the target feature map, to obtain a second predicted feature map of the current frame, where In one embodiment, the M feature domain optical flow(s) are the first feature domain optical flow, the second feature domain optical flow, or the third feature domain optical flow; performing feature fusion based on the feature map of the current frame and the second predicted feature map, to obtain an enhanced feature map of the current frame; and performing picture reconstruction on the enhanced feature map, to obtain a reconstructed picture of the current frame.

Figure 12A:
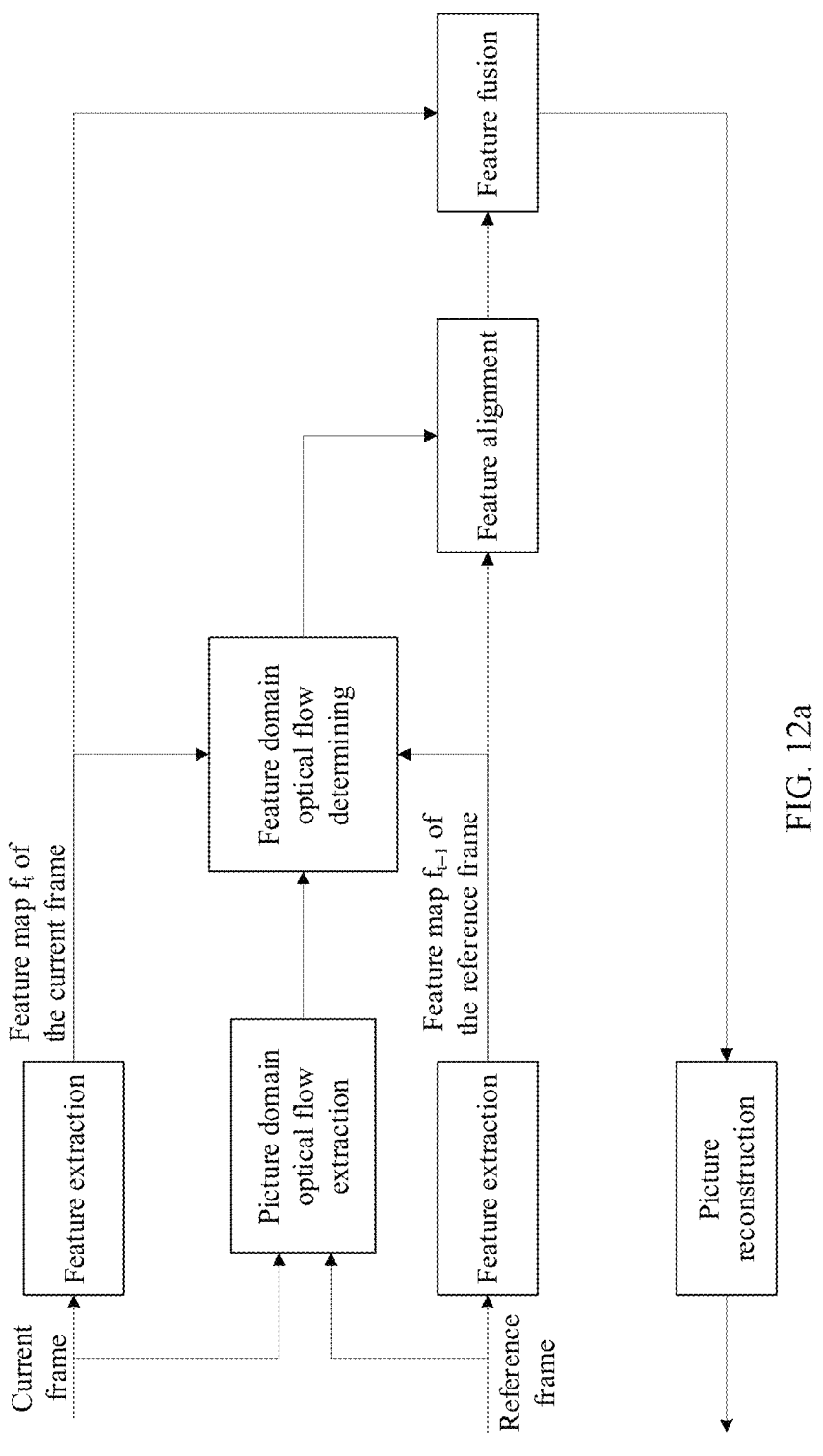
FIG. 12a is a diagram of a video enhancement process according to an embodiment of this application.

Application of the optical flow determined in the method in this application in a video enhancement field is specifically described. Specifically, as shown in FIG. 12*a*, feature extraction is separately performed on the current frame and the reference frame, to obtain the feature $f_t$ of the current frame and the feature $f_{t-1}$ of the reference frame. For a feature extraction manner, refer to the foregoing related descriptions. The picture domain optical flow between the current frame and the reference frame is obtained; and the first feature domain optical flow, the second feature domain optical flow, or the third feature domain optical flow that may be obtained in the foregoing manner based on the feature map of the current frame, the feature map of the reference frame, and the picture domain optical flow between the current frame and the reference frame. The precision obtained by using the second feature domain optical flow is higher than the precision obtained by using the first feature domain optical flow. The precision obtained by using the third feature domain optical flow is higher than the precision obtained by using the second feature domain optical flow. Feature alignment processing is performed on the M feature domain optical flows and the feature map $f_{t-1}$ of the reference frame, to obtain the second predicted feature map of the current frame. The feature alignment processing may be performed in a warping or DCN manner, or certainly may be performed in another manner in which feature alignment can be implemented. This is not limited herein. Feature fusion is performed based on the feature map of the current frame and the second predicted feature map, to obtain the enhanced feature map of the current frame. Picture reconstruction is performed on the enhanced feature map, to obtain the reconstructed picture of the current frame.

A reconstruction network shown in b in FIG. 11 or another network may perform picture reconstruction on the enhanced feature map. For example, the another network may be a network obtained by adjusting at least one of a size of a convolution kernel, a quantity of feature map channels, an upsampling factor, a quantity of upsampling times, a quantity of convolutional layers, and a network activation layer based on the reconstruction network shown in b in FIG. 11.

Beneficial effects of video compression performed by using the method in this application may be learned by using the following experiment:

A test set uses three types of videos in an HEVC standard test set: respectively HEVC_B with a resolution of 1080P, HEVC C with a resolution of 832×480, and HEVC_D with a resolution of 416×240. Each type of videos includes about four to five videos. A frame rate ranges from 24 fps to 60 fps. First 100 frames of each video are tested.

In a comparison method, a case of using the method in this application and a case of not using the method in this application are compared.

Figure 12B:
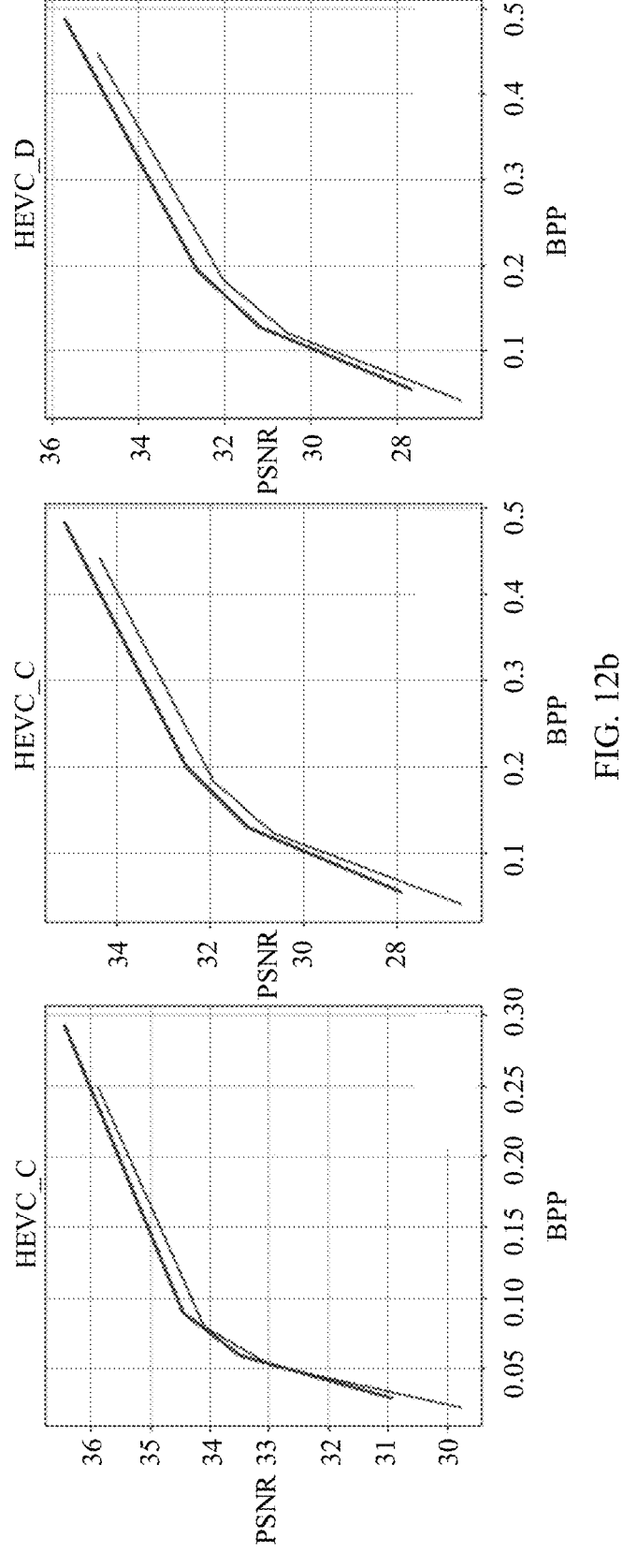
FIG. 12b is a diagram of video enhancement effect according to an embodiment of this application.

An experiment result is shown in FIG. 12*b*. There are two broken lines. A dark line indicates that the method in this application is used. A light line indicates that the method in this application is not used. As shown in FIG. 12*b*, a conclusion of this experiment is described from two dimensions: a peak signal-to-noise ratio (PSNR) and a quantity of bits per pixel (BPP). In a case of a same quantity of bits per pixel, a peak signal-to-noise ratio of a video when the method in this application is used is higher than a peak signal-to-noise ratio of a video when the method in this application is not used, that is, quality of the video when the method in this application is higher than quality of the video when the method in this application is not used. In a case of a same peak signal-to-noise ratio, a quantity of bits per pixel of a video when the method in this application is used is less than a quantity of bits per pixel of a video when the method in this application is not used. In other words, when video compression is performed, a bit rate is better saved when the method in this application is used than when the method in this application is not used.

In this embodiment, the feature domain optical flow determined in the manner of this application is applied in video enhancement, and may be used in post-processing of video compression. Feature prediction accuracy is enhanced by monitoring a feature domain optical flow based on a picture domain optical flow, thereby improving video enhancement effect and improving video quality.

In a feasible embodiment, the M feature maps of the reference frame are M feature maps of the reference frame at different scales, and the method further includes:

performing M times of feature reconstruction processing based on M predicted feature maps of the current frame, to obtain a reconstructed picture of the current frame, where a processed video includes the reconstructed picture of the current frame, and the M predicted feature maps of the current frame are obtained by performing feature alignment processing separately on the M feature domain optical flows and the M feature maps of the reference frame.

In a feasible embodiment, performing M times of feature domain optical flow estimation based on the M feature maps of the reference frame and the picture domain optical flow between the current frame and the reference frame, to obtain the M feature domain optical flows includes:

when an $i^{th}$ time of feature domain optical flow estimation is performed, performing optical flow estimation based on a picture domain optical flow feature map $$f v_t^{i-1},$$

to obtain a picture domain optical flow feature map $$f v_t^i,$$

where i is an integer greater than 0 and not greater than M, and when i=1, the picture domain optical flow feature map $$f v_t^{i-1}$$

is the picture domain optical flow between the current frame and the reference frame; and performing adaptive processing based on a feature map $$f_{t-1}^i$$

of the reference frame, the picture domain optical flow feature map $$f v_t^i,$$

and a predicted feature map $$\tilde{f}_t^{i+1}$$

of the current frame, to obtain a feature domain optical flow feature map $$v_t^{fi},$$

where the feature map $$f_{t-1}^i$$

of the reference frame is obtained by performing feature extraction on a feature map $$f_{t-1}^{i-1}$$

of the reference frame, the feature map $$f_{t-1}^{i-1}$$

of the reference frame and the feature map $$f_{t-1}^i$$

of the reference frame are respectively two of the M feature maps of the reference frame, and when i=M, the predicted feature $$\tilde{f}_t^{i+1}$$

of the current frame is a constant.

The M feature domain optical flows include the feature domain optical flow feature map $$v_t^{fi},$$

and the predicted feature map $$\tilde{f}_t^{i+1}$$

of the current frame is obtained by performing feature alignment processing on a feature map $$f_{t-1}^{i+1}$$

of the reference frame and a feature domain optical flow feature $$v_t^{fi+1}.$$

Figure 13:
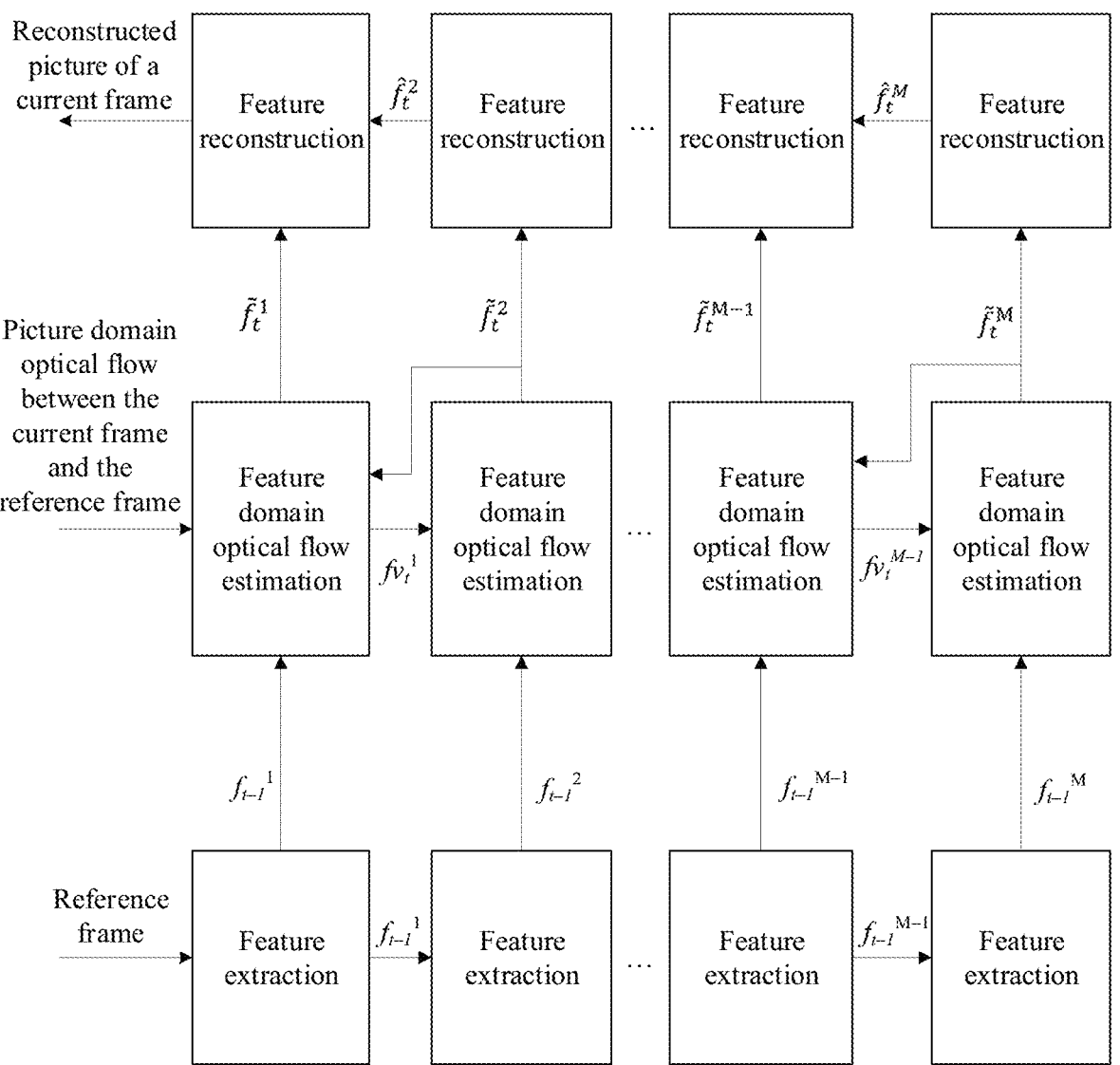
FIG. 13 is a diagram of a multi-scale feature domain optical flow determining process according to an embodiment of this application.
Figure 14:
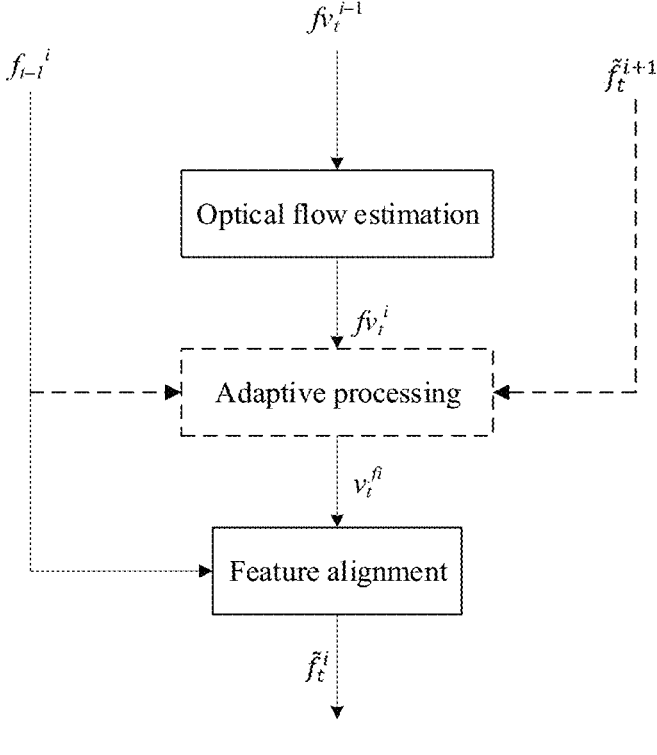
FIG. 14 is a diagram of a feature domain optical flow estimation process according to an embodiment of this application.

Specifically, as shown in FIG. 13, feature extraction is performed on the reference frame, to obtain a feature map $$f_{t-1}^1$$

of the reference frame; and feature extraction is performed on the feature map $$f_{t-1}^1$$

of the reference frame, to obtain a feature map $$f_{t-1}^2$$

of the reference frame. In this manner, feature maps of the reference frame at a plurality of scales can be obtained, that is, the M feature maps of the reference frame. The feature domain optical flow estimation shown in FIG. 13 is implemented based on a network structure shown in FIG. 14. When a first time of feature domain optical flow estimation is performed, optical flow estimation is performed based on the picture domain optical flow between the current frame and the reference frame, to obtain a picture domain optical flow feature map $$f v_t^1;$$

and feature alignment processing is performed on the feature map $$f_{t-1}^1$$

of the reference frame and the picture domain optical flow feature map $$f v_t^1,$$

to obtain a predicted feature map $$\hat{f}_t^1$$

of the current frame. In one embodiment, before the feature alignment processing is performed, adaptive processing is performed based on the picture domain optical flow feature map $$f v_t^1,$$

the feature map $$f_{t-1}^1$$

of the reference frame, and a predicted feature map $$\hat{f}_t^2$$

of the current frame, to obtain a feature domain optical flow feature map $$v_t^{f1}.$$

Then, feature alignment processing is performed on the feature map $$f_{t-1}^1$$

of the reference frame and the feature domain optical flow feature map $$v_t^{f1},$$

to obtain the predicted feature map $$\hat{f}_t^1$$

of the current frame.

When a second time of feature domain optical flow estimation is performed, optical flow estimation is performed based on the picture domain optical flow feature map $$f v_t^1,$$

to obtain a picture domain optical flow feature map $$f v_t^2;$$

and feature alignment processing is performed on a feature map $$f_{t-1}^2$$

of the reference frame and the picture domain optical flow feature map $$f v_t^2,$$

to obtain a predicted feature map $$\hat{f}_t^2$$

of the current frame. In one embodiment, before the feature alignment processing is performed, adaptive processing is performed based on the picture domain optical flow feature map $$f v_t^2,$$

the feature map $$f_{t-1}^2$$

of the reference frame, and a predicted feature map $$\hat{f}_t^3$$

of the current frame, to obtain a feature domain optical flow feature map $$v_t^{f2}.$$

Then, feature alignment processing is performed on the feature map $$f_{t-1}^2$$

of the reference frame and the feature domain optical flow feature map $$v_t^{f2},$$

to obtain the predicted feature map $$\tilde{f}_t^2$$

of the current frame.

When a third time of feature domain optical flow estimation is performed, optical flow estimation is performed based on the picture domain optical flow feature map $$fv_t^2,$$

to obtain a picture domain optical flow feature map $$fv_t^3;$$

and feature alignment processing is performed on a feature map $$f_{t-1}^3$$

of the reference frame and the picture domain optical flow feature map $$fv_t^3,$$

to obtain a predicted feature map $$\tilde{f}_t^3$$

of the current frame. In one embodiment, before the feature alignment processing is performed, adaptive processing is performed based on the picture domain optical flow feature map $$fv_t^3,$$

the feature map $$f_{t-1}^3$$

of the reference frame, and a predicted feature map $$\tilde{f}_t^4$$

of the current frame, to obtain a feature domain optical flow feature map $$v_t^{f3}.$$

Then, feature alignment processing is performed on the feature map $$f_{t-1}^3$$

of the reference frame and the feature domain optical flow feature map $$v_t^{f3},$$

to obtain the predicted feature map $$\tilde{f}_t^3$$

of the current frame.

When an $M^{th}$ time of feature domain optical flow estimation is performed, optical flow estimation is performed based on a picture domain optical flow feature map $$fv_t^{M-1},$$

to obtain a picture domain optical flow feature map $$fv_t^M;$$

and feature alignment processing is performed on a feature map $$f_{t-1}^M$$

of the reference frame and the picture domain optical flow feature map $$fv_t^M,$$

to obtain a predicted feature map $$\hat{f}_t^M$$

of the current frame. In one embodiment, before the feature alignment processing is performed, adaptive processing is performed based on the picture domain optical flow feature map $$fv_t^M,$$

the feature map $$f_{t-1}^M$$

of the reference frame, and a predicted feature map $$\hat{f}_t^{M+1}$$

of the current frame, to obtain a feature domain optical flow feature map $$v_t^{fM}.$$

Then, feature alignment processing is performed on the feature map $$f_{t-1}^M$$

of the reference frame and the feature domain optical flow feature map $$v_t^{fM},$$

to obtain the predicted feature map $$\hat{f}_t^M$$

of the current frame. The predicted feature map $$\hat{f}_t^{M+1}$$

of the current frame is a constant or does not exist. In other words, the predicted feature map $$\hat{f}_t^{M+1}$$

of the current frame is not used in the $M^{th}$ time of feature domain optical flow estimation.

In the foregoing manner, the M predicted feature maps of the current frame can be obtained. After the M predicted feature maps of the current frame are obtained, feature reconstruction is performed on the predicted feature $$\hat{f}_t^M$$

of the current frame, to obtain a reconstructed feature map $$\hat{f}_t^M$$

of the current frame; feature reconstruction is performed on the reconstructed feature map $$\hat{f}_t^M$$

of the current frame and the predicted feature map $$\hat{f}_t^{M-1}$$

of the current frame, to obtain a reconstructed feature map $$\hat{f}_t^{M-1}$$

of the current frame; . . . ; feature reconstruction is performed on a reconstructed feature map $$\hat{f}_t^3$$

of the current frame and a predicted feature map $$\hat{f}_t^2$$

of the current frame, to obtain a reconstructed feature map $$\hat{f}_t^2$$

of the current frame; and feature reconstruction is performed on a reconstructed feature map $$\hat{f}_t^2$$

of the current frame and a predicted feature map $$\tilde{f}_t^1$$

of the current frame, to obtain a reconstructed picture of the current frame.

It should be noted herein that, when a predicted feature map $$\tilde{f}_t^j$$

the current frame is obtained, a predicted feature map $$\tilde{f}_t^{j+1}$$

of the current frame is used. This is not contradictory, because the predicted feature map $$\tilde{f}_t^{j+1}$$

of the current frame is obtained before the predicted feature map $$\tilde{f}_t^j$$

of the current frame.

The following describes the foregoing process from another perspective. When the picture domain optical flow between the current frame and the reference frame is obtained, optical flow estimation is performed on the picture domain optical flow between the current frame and the reference frame, to obtain a picture domain optical flow feature map $$fv_t^1;$$

optical flow estimation is performed based on the picture domain optical flow feature map $$fv_t^1,$$

to obtain a picture domain optical flow feature map $$fv_t^2;$$

optical flow estimation is performed based on the picture domain optical flow feature map $$fv_t^2,$$

to obtain a picture domain optical flow feature map $$fv_t^3;$$

. . . ; optical flow estimation is performed based on a picture domain optical flow feature map $$fv_t^{M-2},$$

to obtain a picture domain optical flow feature map $$fv_t^{M-1};$$

adaptive processing is performed based on a picture domain optical flow feature map $$fv_t^M,$$

a feature map $$f_{t-1}^M$$

of the reference frame, and a predicted feature map $$\tilde{f}_t^{M+1}$$

of the current frame, to obtain a feature domain optical flow feature map $$v_t^{fM};$$

and feature alignment processing is performed on the feature map $$f_{t-1}^M$$

of the reference frame and the feature domain optical flow feature map $$v_t^{fM},$$

to obtain a predicted feature map $$\tilde{f}_t^M$$

of the current frame. The predicted feature map $$\tilde{f}_t^{M+1}$$

of the current frame is a constant or does not exist. Adaptive processing is performed based on a picture domain optical flow feature map $$f v_t^{M-1},$$

a feature map $$f_{t-1}^{M-1}$$

of the reference frame, and a predicted feature map $$\tilde{f}_t^M$$

of the current frame, to obtain a feature domain optical flow feature map $$v_t^{fM-1},$$

and feature alignment processing is performed on the feature map $$f_{t-1}^{M-1}$$

of the reference frame and the feature domain optical flow feature map $$v_t^{fM-1},$$

to obtain a predicted feature map $$\tilde{f}_t^{M-1}$$

of the current frame; . . . ; and adaptive processing is performed based on the picture domain optical flow feature map $$f v_t^1,$$

a feature map $$f_{t-1}^1$$

of the reference frame, and a predicted feature map $$\tilde{f}_t^2$$

of the current frame, to obtain a feature domain optical flow feature map $$v_t^{f1},$$

and feature alignment processing is performed on the feature map $$f_{t-1}^1$$

of the reference frame and the feature domain optical flow feature map $$v_t^{f1},$$

to obtain a predicted feature map $$\tilde{f}_t^1$$

of the current frame. It can be learned that a predicted feature map $$\tilde{f}_t^{i+1}$$

of the current frame is used in obtaining a predicted feature map $$\tilde{f}_t^i$$

of the current frame. This is not contradictory.

Figure 15:
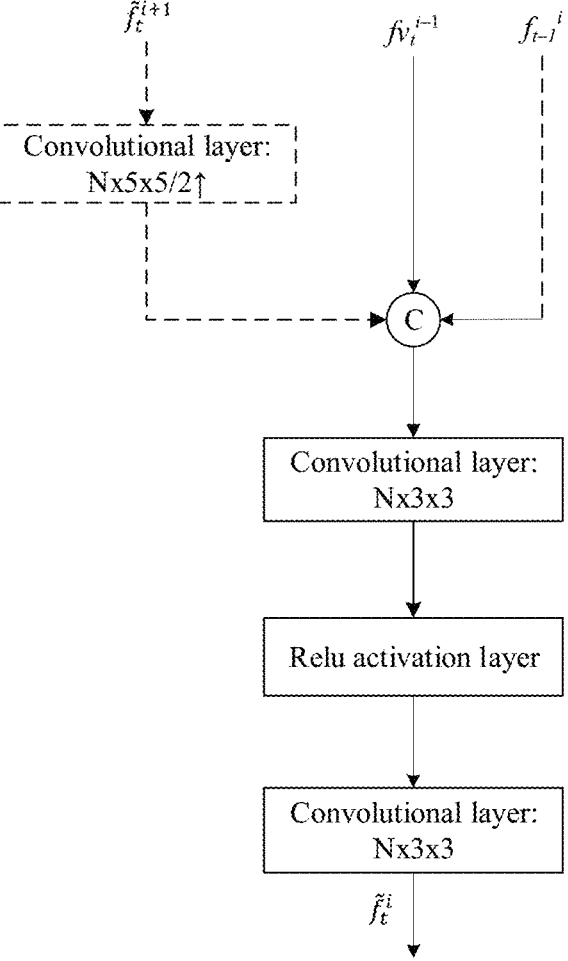
FIG. 15 is a diagram of a structure of an adaptive network according to an embodiment of this application.

In an example, an adaptive network shown in FIG. 15 may implement a specific implementation process of performing adaptive processing based on the feature map $$f_{t-1}^i$$

of the reference frame, the picture domain optical flow feature map $$f v_t^i,$$

and the predicted feature map $$\tilde{f}_t^{i+1}$$

of the current frame to obtain a feature domain optical flow feature map $$v_t^{fi}.$$

As shown in FIG. 15, the adaptive network includes one deconvolutional layer, two convolutional layers, and one relu activation layer. It should be noted herein that the adaptive network shown in FIG. 15 is merely an example, and is not intended to limit this application.

It should be noted herein that for specific implementation processes of feature extraction, optical flow estimation, feature alignment, and feature reconstruction, reference may be made to the related descriptions in the foregoing embodiments. Details are not described herein again.

It should be understood that, in this application, the M feature maps of the reference frame may further include the reference frame, the reference frame is a feature map of the reference frame of the largest scale, and the reference frame may be considered as being obtained by performing special feature extraction on the reference frame once. In the foregoing embodiment, when the M feature maps of the reference frame include the reference frame, the target feature map may be a feature map of the largest scale in the M feature maps of the reference frame, that is, the reference frame. When the M feature maps of the reference frame do not include the reference frame, and M=1, the target feature map is a feature map obtained by performing feature extraction on the reference frame once.

Figure 16:
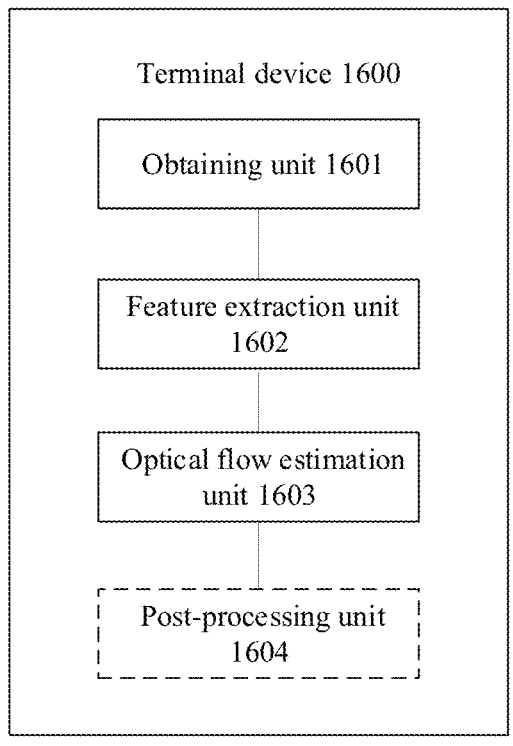
FIG. 16 is a diagram of a structure of a terminal device according to an embodiment of this application.

FIG. 16 is a diagram of a structure of a terminal device according to an embodiment of this application. As shown in FIG. 16, the terminal device 1600 includes:

an obtaining unit 1601, configured to obtain a picture domain optical flow between a current frame and a reference frame, where the current frame and the reference frame are two frames in a video;

a feature extraction unit 1602, configured to perform multi-scale feature extraction on the reference frame, to obtain M feature map(s) of the reference frame, where M is an integer greater than or equal to 1; and an optical flow estimation unit 1603, configured to perform M time(s) of feature domain optical flow estimation based on the M feature map(s) of the reference frame and the picture domain optical flow between the current frame and the reference frame, to obtain M feature domain optical flow(s).

In one embodiment, when M=1, the M feature map of the reference frame is a target feature map, and the optical flow estimation unit 1603 is specifically configured to:

perform feature domain optical flow estimation based on the target feature map and the picture domain optical flow between the current frame and the reference frame, to obtain a first feature domain optical flow; and perform adaptive processing on the first feature domain optical flow based on a feature map of the current frame and the target feature map, to obtain a second feature domain optical flow, where precision obtained by using the second feature domain optical flow is higher than precision obtained by using the first feature domain optical flow, and the M feature domain optical flow is the second feature domain optical flow.

In one embodiment, when M=1, the M feature map of the reference frame is a target feature map, and the optical flow estimation unit 1603 is specifically configured to:

perform feature domain optical flow estimation based on the target feature map and the picture domain optical flow between the current frame and the reference frame, to obtain a first feature domain optical flow;

perform at least one time of iteration processing based on a feature map of the current frame, the target feature map, and the first feature domain optical flow, to obtain a third feature domain optical flow, where the M feature domain optical flow is the third feature domain optical flow; and when a $j^{th}$ time of iteration processing is performed, perform feature alignment processing on the target feature map and a feature domain optical flow $$v_t^{fj},$$

to obtain a predicted feature map $$\tilde{f}_t^{j}$$

of the current frame, where j is an integer greater than 0, and when j=1, the feature domain optical flow $$v_t^{fj}$$

is the first feature domain optical flow; perform fine-tuning processing based on the target feature map, the feature map of the current frame, and the predicted feature map $$\tilde{f}_t^{j}$$

of the current frame, to obtain a fine-tuned feature domain optical flow $$vf_{t1}^{j};$$

fuse the fine-tuned feature domain optical flow $$vf_{t1}^{j}$$

and a feature domain optical flow $$vf_{t2}^{j-1},$$

to obtain a feature domain optical flow $$vf_{t2}^{j},$$

where when j=1, the feature domain optical flow $$vf_{t2}^{j-1}$$

is the first feature domain optical flow; and determine a feature domain optical flow $$v_t^{fj+1}$$

based on the feature domain optical flow $$vf_{t2}^{j}.$$

If the feature domain optical flow $$v_t^{fj+1}$$

is obtained through a final time of iteration processing, the feature domain optical flow $$v_t^{fj+1}$$

is the third feature domain optical flow.

In one embodiment, when M=1, the M feature map of the reference frame is a target feature map, and the optical flow estimation unit 1603 is specifically configured to:

perform feature domain optical flow estimation based on the target feature map and the picture domain optical flow between the current frame and the reference frame, to obtain the first feature domain optical flow; and perform adaptive processing on the first feature domain optical flow based on the feature map of the current frame and the target feature map, to obtain the second feature domain optical flow;

perform at least one time of iteration processing based on the feature map of the current frame, the target feature map, and the second feature domain optical flow, to obtain a third feature domain optical flow, where the M feature domain optical flow is the third feature domain optical flow; and when a j$^{th}$ time of iteration processing is performed, perform feature alignment processing on the target feature map and a feature domain optical flow $$v_t^{fj},$$

to obtain a predicted feature map $$\hat{f}_t^{j}$$

of the current frame, where j is an integer greater than 0, and when j=1, the feature domain optical flow $$v_t^{fj}$$

is the second feature domain optical flow; perform fine-tuning processing based on the target feature map, the feature map of the current frame, and the predicted feature map $$\hat{f}_t^{j}$$

of the current frame, to obtain a fine-tuned feature domain optical flow $$vf_{t1}^{j};$$

fuse the fine-tuned feature domain optical flow $$vf_{t1}^{j}$$

and a feature domain optical flow $$vf_{t2}^{j-1},$$

to obtain a feature domain optical flow $$vf_{t2}^{j},$$

where when j=1, the feature domain optical flow $$v_{t2}^{fj-1}$$

is the first feature domain optical flow; and determine a feature domain optical flow $$v_t^{fj+1}$$

based on the feature domain optical flow $$vf_{t2}^{j}.$$

If the feature domain optical flow $$v_t^{fj+1}$$

is obtained through a final time of iteration processing, the feature domain optical flow $$v_t^{fj+1}$$

is the third feature domain optical flow.

In one embodiment, when determining the feature domain optical flow $$v_t^{fj+1}$$

based on the feature domain optical flow $$vf_{t2}^j,$$

the optical flow estimation unit 1603 is specifically configured to:

determine the feature domain optical flow $$vf_{t2}^j$$

as the feature domain optical flow $$v_t^{fj+1};$$

or perform adaptive processing on the feature domain optical flow $$vf_{t2}^j$$

based on the feature map of the current frame and the target feature map, to obtain the feature domain optical flow $$v_t^{fj+1},$$

where precision obtained by using the feature domain optical flow $$v_t^{fj+1}$$

is higher than precision obtained by using the feature domain optical flow $$vf_{t2}^j.$$

In one embodiment, the terminal device 1600 further includes:

a post-processing unit 1604, configured to: perform coding processing on the M feature domain optical flow, to obtain a fourth feature domain optical flow; perform feature alignment processing on the fourth feature domain optical flow and the target feature map, to obtain a first predicted feature map of the current frame; obtain a feature domain residual map based on the feature map of the current frame and the first predicted feature map; and encode the feature domain residual map, to obtain a feature domain residual bitstream.

In one embodiment, the terminal device 1600 further includes:

a post-processing unit 1604, configured to: perform feature alignment processing on the M feature domain optical flow and the target feature map, to obtain a second predicted feature map of the current frame, where the fourth feature domain optical flow is the first feature domain optical flow, the second feature domain optical flow, or the third feature domain optical flow; perform feature fusion based on the feature map of the current frame and the second predicted feature map, to obtain an enhanced feature map of the current frame; and perform picture reconstruction on the enhanced feature map, to obtain a reconstructed picture of the current frame.

In one embodiment, when M is greater than 1, the M feature maps of the reference frame are M feature maps of the reference frame at different scales, and the terminal device 1600 further includes:

a post-processing unit 1604, configured to: perform M times of feature reconstruction processing based on M predicted feature maps of the current frame, to obtain a reconstructed picture of the current frame, where a processed video includes the reconstructed picture of the current frame, and the M predicted feature maps of the current frame are obtained by performing feature alignment processing separately on the M feature domain optical flows and the M feature maps of the reference frame at different scales.

In one embodiment, the optical flow estimation unit 1603 is specifically configured to:

when an $i^{th}$ time of feature domain optical flow estimation is performed, perform optical flow estimation based on a picture domain optical flow feature map $$fv_t^{j-1},$$

to obtain a picture domain optical flow feature map $$fv_t^j,$$

where i is an integer greater than 0 and not greater than M, and when i=1, the picture domain optical flow feature map $$fv_t^{j-1}$$

is the picture domain optical flow between the current frame and the reference frame; and perform adaptive processing based on a feature map $$f_{t-1}^i$$

of the reference frame, the picture domain optical flow feature map $$fv_t^i,$$

and a predicted feature map $$\tilde{f}_t^{i+1}$$

of the current frame, to obtain a feature domain optical flow feature map $$v_t^{fi},$$

where the feature map $$f_{t-1}^i$$

of the reference frame is obtained by performing feature extraction on a feature map $$f_{t-1}^{i-1}$$

of the reference frame, the feature map $$f_{t-1}^{i-1}$$

of the reference frame and the feature map $$f_{t-1}^i$$

of the reference frame are respectively two of the M feature maps of the reference frame, and when i=M, the predicted feature $$\tilde{f}_t^{i+1}$$

of the current frame is a constant, and the M feature domain optical flows include the feature domain optical flow feature map $$v_t^{fi},$$

and the predicted feature $$\tilde{f}_t^{i+1}$$

of the current frame is obtained by performing feature alignment processing on a feature map $$f_{t-1}^{i+1}$$

of the reference frame and a feature domain optical flow feature $$v_t^{fi+1}.$$

It should be noted that the foregoing units (the obtaining unit 1601, the feature extraction unit 1602, the optical flow estimation unit 1603, and the post-processing unit 1604) are configured to perform related operations of the foregoing method. Therefore, for beneficial effects that can be achieved by the units, refer to the beneficial effects in the corresponding method provided above. Details are not described herein again. For example, the obtaining unit 1601 is configured to perform related content of S601, the feature extraction unit 1602 is configured to perform related content of S602, and the optical flow estimation unit 1603 and the post-processing unit 1604 are configured to perform related content of S603.

A person skilled in the art can appreciate that functions described with reference to various illustrative logical blocks, modules, and algorithm operations disclosed and described in this specification may be implemented by hardware, software, firmware, or any combination thereof. If software is used for implementation, the functions described with reference to the illustrative logical blocks, modules, and operations may be stored in or transmitted over a computer-readable medium as one or more instructions or code and executed by a hardware-based processing unit. The computer-readable medium may include a computer-readable storage medium corresponding to a tangible medium, such as a data storage medium, or any communication medium that facilitates transmission of a computer program from one place to another (for example, according to a communication protocol). In this manner, the computer-readable medium may generally correspond to: (1) a non-transitory tangible computer-readable storage medium, or (2) a communication medium, for example, a signal or a carrier. The data storage medium may be any usable medium that can be accessed by one or more computers or one or more processors to retrieve instructions, code, and/or data structures for implementing the technologies described in this application. A computer program product may include a computer-readable medium.

As an example rather than a limitation, such computer-readable storage medium may include a RAM, a ROM, an EEPROM, a CD-ROM or another compact disc storage apparatus, a magnetic disk storage apparatus or another magnetic storage apparatus, a flash memory, or any other medium that can store required program code in a form of instructions or data structures and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (digital subscriber line, DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically through lasers. Combinations of the foregoing items should also be included within the scope of the computer-readable medium.

Instructions may be executed by one or more processors such as one or more digital signal processors (DSP), a general-purpose microprocessor, an application-specific integrated circuit (ASIC), a field programmable gate array (FPGA), or another equivalent integrated or discrete logic circuit. Therefore, the term "processor" used in this specification may indicate the foregoing structure, or any other structure suitable for implementation of the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may be all implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize function aspects of apparatuses configured to perform the disclosed technologies, but do not necessarily need to be implemented by different hardware units. Actually, as described above, various units may be combined into a codec hardware unit in combination with appropriate software and/or firmware, or may be provided by interoperable hardware units (including the one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A feature domain optical flow determining method, comprising:
   obtaining a picture domain optical flow between a current frame and a reference frame;
   performing a multi-scale feature extraction on the reference frame, to obtain M feature maps of the reference frame, wherein M is an integer greater than or equal to 1; and
   performing M times of a feature domain optical flow estimation based on the M feature maps of the reference frame and the picture domain optical flow between the current frame and the reference frame, to obtain M feature domain optical flows, including, when M=1:
   performing the feature domain optical flow estimation based on one feature map and the picture domain optical flow between the current frame and the reference frame, to obtain a first feature domain optical flow; and
   performing an adaptive processing on the first feature domain optical flow based on a feature map of the current frame and the one feature map, to obtain a second feature domain optical flow.

2. The method according to claim 1, wherein when M=1, the performing M times of the feature domain optical flow estimation based on the M feature maps of the reference frame and the picture domain optical flow between the current frame and the reference frame, to obtain M feature domain optical flows further comprises:
   performing at least one time of an iteration processing based on a feature map of the current frame, a target feature map, and the first or the second feature domain optical flow, to obtain a third feature domain optical flow; and
   when a $j^{th}$ time of the iteration processing is performed, performing a feature alignment processing on the target feature map and a feature domain optical flow $$v_t^{fj},$$

to obtain a predicted feature map $$\tilde{f}_t^{j}$$

of the current frame, wherein j is an integer greater than 0, and when j=1, the feature domain optical flow $$v_t^{fj}$$

is the first feature domain optical flow;
   performing a fine-tuning processing based on the target feature map, the feature map of the current frame, and the predicted feature map $$\tilde{f}_t^{j}$$

of the current frame, to obtain a fine-tuned feature domain optical flow $$vf_{t1}^{j};$$

fusing the fine-tuned feature domain optical flow $$vf_{t1}^{j}$$

and a feature domain optical flow $$vf_{t2}^{j-1},$$

to obtain a feature domain optical flow $$vf_{t2}^j,$$

wherein when j=1, the feature domain optical flow $$vf_{t2}^{j-1}$$

is the first feature domain optical flow; and
   determining a feature domain optical flow $$v_t^{fj+1}$$

based on the feature domain optical flow $$vf_{t2}^j,$$

wherein
   in response to the feature domain optical flow $$v_t^{fj+1}$$

is obtained through a final time of the iteration processing, the feature domain optical flow $$v_t^{fj+1}$$

is the third feature domain optical flow.
   3. The method according to claim 2, wherein the determining the feature domain optical flow $$v_t^{fj+1}$$

based on the feature domain optical flow $$vf_{t2}^j$$

comprises:
   determining the feature domain optical flow $$vf_{t2}^j$$

as the feature domain optical flow $$v_t^{fj+1};$$

or performing an adaptive processing on the feature domain optical flow $vf_{t2}^j$ based on the feature map of the current frame and the target feature map, to obtain the feature domain optical flow $$v_t^{fj+1}.$$

4. The method according to claim 1, further comprising:
performing a coding processing on the second feature domain optical flow, to obtain a fourth feature domain optical flow;
performing a feature alignment processing on the fourth feature domain optical flow and a target feature map, to obtain a first predicted feature map of the current frame;
obtaining a feature domain residual map based on the feature map of the current frame and the first predicted feature map; and
encoding the feature domain residual map, to obtain a feature domain residual bitstream.
5. The method according to claim 1, further comprising:
performing a feature alignment processing on the second feature domain optical flow and a target feature map, to obtain a second predicted feature map of the current frame;
performing a feature fusion based on the feature map of the current frame and the second predicted feature map, to obtain an enhanced feature map of the current frame; and
performing a picture reconstruction on the enhanced feature map, to obtain a reconstructed picture of the current frame.
6. The method according to claim 1, wherein when M is greater than 1, the M feature maps of the reference frame are M feature maps of the reference frame at different scales, the method further comprising:
performing M times of a feature reconstruction processing based on M predicted feature maps of the current frame, to obtain a reconstructed picture of the current frame, wherein
a processed video comprises the reconstructed picture of the current frame, and the M predicted feature maps of the current frame are obtained by performing a feature alignment processing separately on the M feature domain optical flows and the M feature maps of the reference frame at different scales.
7. An electronic device, comprising:
one or more processors; and
a computer-readable storage medium, coupled to the processors and storing a program executed by the processors, wherein when the program is executed by the processors, the electronic device is enabled to perform:
obtaining a picture domain optical flow between a current frame and a reference frame;
performing a multi-scale feature extraction on the reference frame, to obtain M feature maps of the reference frame, wherein M is an integer greater than or equal to 1; and
performing M times of a feature domain optical flow estimation based on the M feature maps of the reference frame and the picture domain optical flow between the current frame and the reference frame, to obtain M feature domain optical flows, including, when M=1:

perform the feature domain optical flow estimation based on one feature map and the picture domain optical flow between the current frame and the reference frame, to obtain a first feature domain optical flow; and perform an adaptive processing on the first feature domain optical flow based on a feature map of the current frame and the one feature map, to obtain a second feature domain optical flow.

8. The electronic device according to claim 7, wherein when M=1, the program further enables the electronic device to:

perform at least one time of an iteration processing based on a feature map of the current frame, a target feature map, and the first or the second feature domain optical flow, to obtain a third feature domain optical flow; and when a $j^{th}$ time of the iteration processing is performed, perform a feature alignment processing on the target feature map and a feature domain optical flow $$v_t^{fj},$$

to obtain a predicted feature map $$\tilde{f}_t^{j}$$

of the current frame, wherein j is an integer greater than 0, and when j=1, the feature domain optical flow $$v_t^{fj}$$

is the first feature domain optical flow;

perform a fine-tuning processing based on the target feature map, the feature map of the current frame, and the predicted feature map $$\tilde{f}_t^{j}$$

of the current frame, to obtain a fine-tuned feature domain optical flow $$vf_{t1}^{j};$$

fuse the fine-tuned feature domain optical flow $$vf_{t1}^{j}$$

and the feature domain optical flow $$vf_{t2}^{j-1},$$

to obtain a feature domain optical flow $$vf_{t2}^{j},$$

wherein when j=1, the feature domain optical flow $$v_{t2}^{fj-1}$$

is the first feature domain optical flow; and determine a feature domain optical flow $$v_t^{fj+1}$$

based on the feature domain optical flow $$vf_{t2}^{j},$$

wherein
in response to the feature domain optical flow $$v_t^{fj+1}$$

is obtained through a final time of the iteration processing, the feature domain optical flow $$v_t^{fj+1}$$

is the third feature domain optical flow.

9. The electronic device according to claim 8, wherein the program further enables the electronic device to:
determine the feature domain optical flow $$vf_{t2}^{j}$$

as the feature domain optical flow $$v_t^{fj+1};$$

or
perform an adaptive processing on the feature domain optical flow $$vf_{t2}^{j}$$

based on the feature map of the current frame and the target feature map, to obtain the feature domain optical flow $$v_t^{fj+1}.$$

10. The electronic device according to claim 7, wherein the program further enables the electronic device to:

perform a coding processing on the second feature domain optical flow, to obtain a fourth feature domain optical flow;

perform a feature alignment processing on the fourth feature domain optical flow and a target feature map, to obtain a first predicted feature map of the current frame;

obtain a feature domain residual map based on the feature map of the current frame and the first predicted feature map; and encode the feature domain residual map, to obtain a feature domain residual bitstream.

11. The electronic device according to claim 7, wherein the program further enables the electronic device to:

perform a feature alignment processing on the second feature domain optical flow and a target feature map, to obtain a second predicted feature map of the current frame;

perform a feature fusion based on the feature map of the current frame and the second predicted feature map, to obtain an enhanced feature map of the current frame; and perform a picture reconstruction on the enhanced feature map, to obtain a reconstructed picture of the current frame.

12. The electronic device according to claim 7, wherein when M is greater than 1, the M feature maps of the reference frame are M feature maps of the reference frame at different scales, and wherein the program further enables the electronic device to:

perform M times of a feature reconstruction processing based on M predicted feature maps of the current frame, to obtain a reconstructed picture of the current frame, wherein a processed video comprises the reconstructed picture of the current frame, and the M predicted feature maps of the current frame are obtained by performing a feature alignment processing separately on the M feature domain optical flows and the M feature maps of the reference frame at different scales.

13. A non-transitory computer-readable storage medium, comprising program code, wherein when the program code is executed by a computer device, cause the computer device to perform:

obtaining a picture domain optical flow between a current frame and a reference frame;

performing a multi-scale feature extraction on the reference frame, to obtain M feature maps of the reference frame, wherein M is an integer greater than or equal to 1; and performing M times of a feature domain optical flow estimation based on the M feature maps of the reference frame and the picture domain optical flow between the current frame and the reference frame, to obtain M feature domain optical flows, including, when M=1:

performing the feature domain optical flow estimation based on one feature map and the picture domain optical flow between the current frame and the reference frame, to obtain a first feature domain optical flow; and performing an adaptive processing on the first feature domain optical flow based on a feature map of the current frame and the one feature map, to obtain a second feature domain optical flow.

14. The non-transitory computer-readable storage medium of claim 13, wherein when M=1, when the program code is executed by the computer device, the computer device is caused to:

performing at least one time of an iteration processing based on a feature map of the current frame, a target feature map, and the first or the second feature domain optical flow, to obtain a third feature domain optical flow; and when a $j^{th}$ time of the iteration processing is performed, performing a feature alignment processing on the target feature map and a feature domain optical flow $$v_t^{fj},$$

to obtain a predicted feature map $$\tilde{f}_t^{j}$$

of the current frame, wherein j is an integer greater than 0, and when j=1, the feature domain optical flow $$v_t^{fj}$$

is the first feature domain optical flow;

performing a fine-tuning processing based on the target feature map, the feature map of the current frame, and the predicted feature map $$\tilde{f}_t^{j}$$

of the current frame, to obtain a fine-tuned feature domain optical flow $$vf_{t1}^{j};$$

fusing the fine-tuned feature domain optical flow $$vf_{t1}^{j}$$

and a feature domain optical flow $$vf_{t2}^{j-1},$$

to obtain a feature domain optical flow $$vf_{t2}^{j},$$

wherein when j=1, the feature domain optical flow $$vf_{t2}^{j-1}$$

is the first feature domain optical flow; and
determining a feature domain optical flow $$v_t^{fj+1}$$

based on the feature domain optical flow $$vf_{t2}^{j},$$

wherein
in response to the feature domain optical flow $$v_t^{fj+1}$$

is obtained through a final time of the iteration processing,
the feature domain optical flow $$v_t^{fj+1}$$

is the third feature domain optical flow.

15. The non-transitory computer-readable storage medium of claim 14, wherein the determining the feature domain optical flow $$v_t^{fj+1}$$

based on the feature domain optical flow $$vf_{t2}^{j}$$

comprises:
determining the feature domain optical flow $$vf_{t2}^{j}$$

as the feature domain optical flow $$v_t^{fj+1};$$

or
performing an adaptive processing on the feature domain optical flow $$vf_{t2}^{j}$$

based on the feature map of the current frame and the target feature map, to obtain the feature domain optical flow $$v_t^{fj+1}.$$

16. The non-transitory computer-readable storage medium of claim 13, when the program code is executed by the computer device, the computer device is caused to:
performing a feature alignment processing on the second feature domain optical flow and a target feature map, to obtain a second predicted feature map of the current frame;
performing a feature fusion based on the feature map of the current frame and the second predicted feature map, to obtain an enhanced feature map of the current frame; and
performing a picture reconstruction on the enhanced feature map, to obtain a reconstructed picture of the current frame.

17. The non-transitory computer-readable storage medium of claim 13, wherein when M is greater than 1, the M feature maps of the reference frame are M feature maps of the reference frame at different scales, and when the program code is executed by the computer device, the computer device is caused to:
performing M times of a feature reconstruction processing based on M predicted feature maps of the current frame, to obtain a reconstructed picture of the current frame, wherein
a processed video comprises the reconstructed picture of the current frame, and the M predicted feature maps of the current frame are obtained by performing a feature alignment processing separately on the M feature domain optical flows and the M feature maps of the reference frame at different scales.

\* \* \* \* \*